US011733823B2

(12) United States Patent
Seth et al.

(10) Patent No.: US 11,733,823 B2
(45) Date of Patent: Aug. 22, 2023

(54) SYNTHETIC MEDIA DETECTION AND MANAGEMENT OF TRUST NOTIFICATIONS THEREOF

(71) Applicant: Microsoft Technology Licensing, LLC, Redmond, WA (US)

(72) Inventors: Rolly Seth, Redmond, WA (US); Nikita Viktorovich Sarychev, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 41 days.

(21) Appl. No.: 17/324,574

(22) Filed: May 19, 2021

(65) Prior Publication Data

US 2022/0374105 A1 Nov. 24, 2022

(51) Int. Cl.
*G06F 3/0481* (2022.01)
*G06T 7/11* (2017.01)
(Continued)

(52) U.S. Cl.
CPC ........ *G06F 3/0481* (2013.01); *G06F 3/04842* (2013.01); *G06F 21/44* (2013.01);
(Continued)

(58) Field of Classification Search
CPC .... G06F 3/0481; G06F 3/04842; G06F 21/44; G06T 7/11; G06T 7/0002; G06T 2200/24; G06N 20/00
(Continued)

(56) References Cited

U.S. PATENT DOCUMENTS

2015/0378600 A1* 12/2015 Sloan .................... G06F 3/0482
715/773
2020/0005078 A1 1/2020 Tambo et al.
(Continued)

FOREIGN PATENT DOCUMENTS

CN 111932544 A 11/2020

OTHER PUBLICATIONS

"Synthetic Media", Retrieved from: https://en.wikipedia.org/wiki/Synthetic_media#:~:text=Synthetic%20media%20(also%20known%20as,intelligence%20algorithms%2C%20such%20as%20for, Mar. 29, 2021, 14 Pages.
(Continued)

*Primary Examiner* — Hope C Sheffield

(57) ABSTRACT

The present disclosure relates to management of synthetic media detection determinations and automatic generation of notifications thereof. Processing of the present disclosure provides a synthetic media detection component, able to be integrated with a plurality of host application/services, where the synthetic media detection component is adapted to work as a trust factor that automatically generates predictive determinations as to whether digital content has been digitally altered. In doing so, trained artificial intelligence processing is applied that executes a contextual analysis of digital content and generates a determination as to whether digital content (or a portion thereof) may be synthetic media. Notifications are automatically generated and provided for rendering across any host application/service endpoints that provide a representation of the digital content including future representations of digital content. Automated generation and transmission of synthetic media detection determinations are aimed at combatting disinformation and subsequent presentation of untrusted/unauthenticated digital content.

20 Claims, 8 Drawing Sheets

(51) Int. Cl.
 *G06N 20/00* (2019.01)
 *G06F 3/04842* (2022.01)
 *G06F 21/44* (2013.01)
 *G06T 7/00* (2017.01)

(52) U.S. Cl.
 CPC .......... *G06N 20/00* (2019.01); *G06T 7/0002* (2013.01); *G06T 7/11* (2017.01); *G06T 2200/24* (2013.01)

(58) Field of Classification Search
 USPC ....................................................... 715/730
 See application file for complete search history.

(56) References Cited

U.S. PATENT DOCUMENTS

| | | |
|---|---|---|
| 2020/0065526 A1* | 2/2020 | Berman ................ G06T 1/0028 |
| 2020/0279358 A1 | 9/2020 | Li et al. |
| 2021/0097382 A1* | 4/2021 | Mathews ............... G06V 20/00 |
| 2021/0112306 A1* | 4/2021 | Ye .................... H04N 21/23418 |
| 2022/0012596 A1* | 1/2022 | Nie ......................... G06T 11/60 |

OTHER PUBLICATIONS

Masood, et al., "Deepfakes Generation and Detection: State-Of-The-Art, Open Challenges, Countermeasures, and Way Forward", In Repository of arXiv:2103.00484v1, Feb. 25, 2021, 42 Pages.
"International Search Report and Written Opinion Issued in PCT Application No. PCT/US22/026613", dated Aug. 2, 2022, 12 Pages.

\* cited by examiner

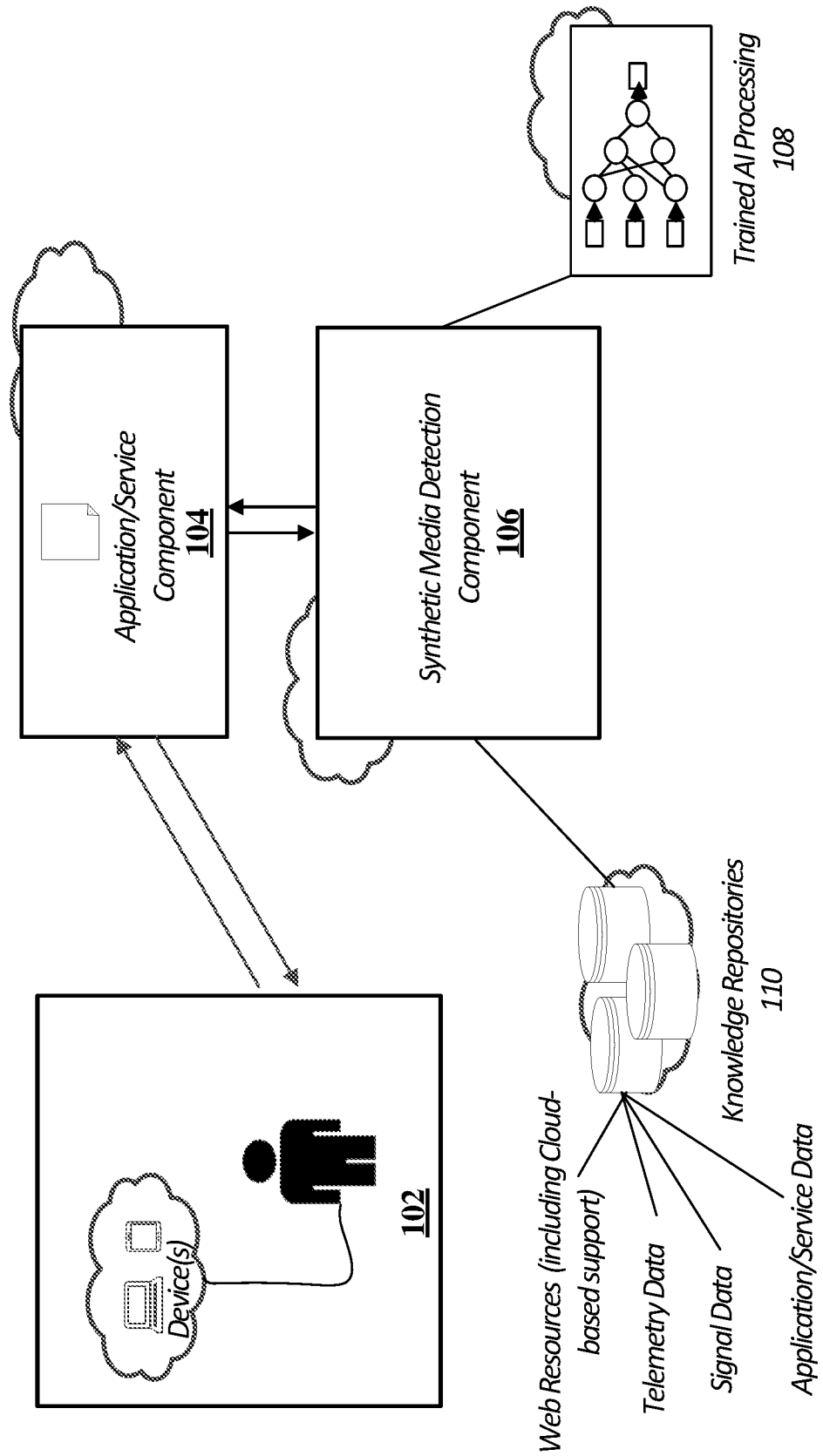

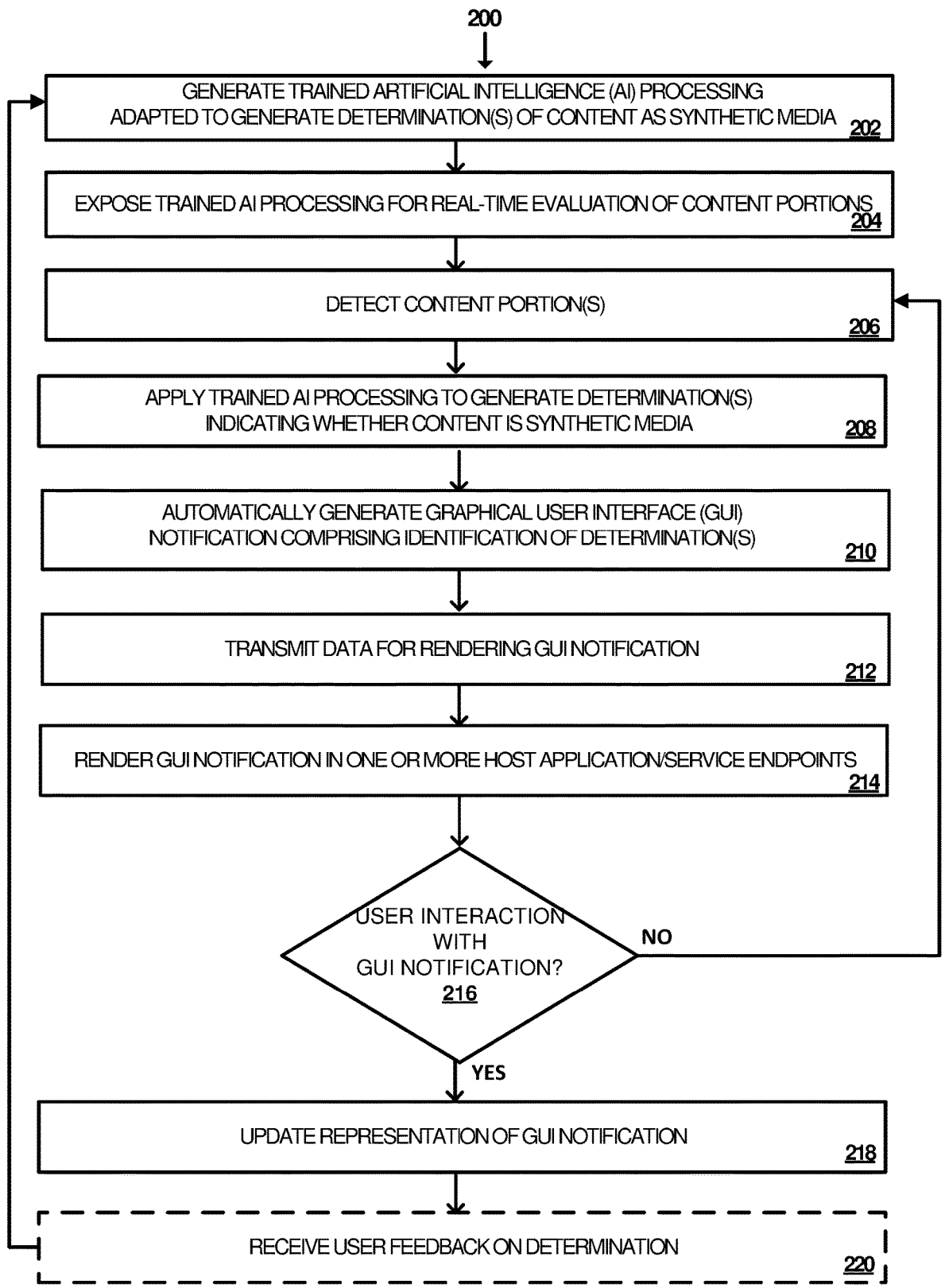

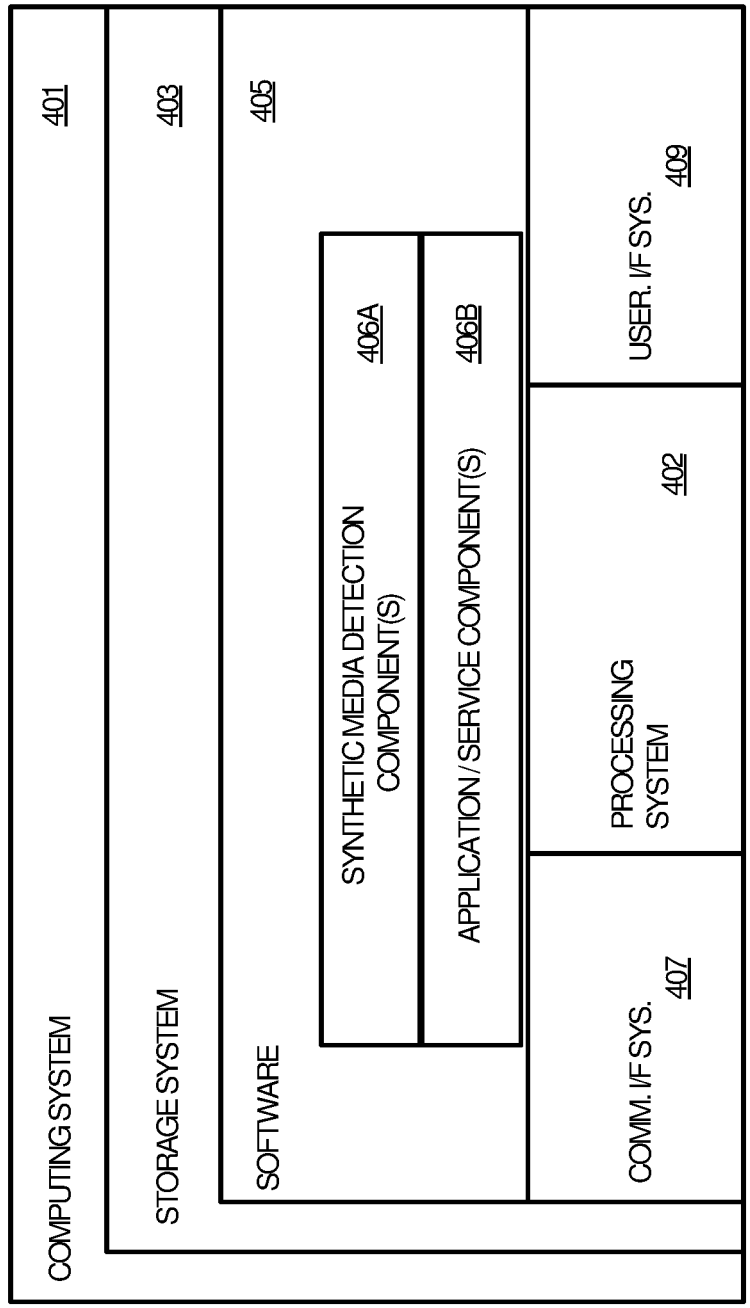

SYNTHETIC MEDIA DETECTION AND MANAGEMENT OF TRUST NOTIFICATIONS THEREOF

BACKGROUND

Technical challenges exist with respect to authentication of digital content. In a world where digital content is growing exponentially, many forms of digital content are being digitally manipulated with technologies such as deep fakes. This breaks user trust where a user may question the authenticity of digital content and how it was created. As a corollary, users may further question the authenticity of other types of digital content that they interact with. This creates a troubling trend when users are viewing digital content as well as considering whether to incorporate that digital content into their own presentations.

Furthermore, general purpose computing is not configured to authenticate content with respect to detection as to whether content was digitally altered. Traditionally, digital content is posted, streamed, etc., without any checks in place to provide users with notice as to whether content was digitally altered. As such, computing devices stand to be improved by being adapted to better manage the authentication of digital content. This technical challenge further extends to applying efficiency and accurate ways to authenticate digital content and notify users of an authentication result.

Additional technical challenges exist when determining how to notify users of results of content authentication. For instance, a portion of digital content may be presented in one document but may be disseminated or broadcast in additional representations of that digital content. Notifying users across all such representations presents a technical challenge, especially trying to do so in real-time.

SUMMARY

For resolution of the above technical problems and other reasons, there is a technical need for the present disclosure that relates to management of synthetic media detection determinations and automatic generation of notifications thereof. Processing of the present disclosure provides a synthetic media detection component, configurable to be integrated with a plurality of host application/services, where the synthetic media detection component is adapted to work as a trust factor that automatically generates predictive determinations (e.g., synthetic media detection determinations) as to whether digital content has been digitally altered (e.g., is the content real or fake). In doing so, trained AI processing (one or more trained AI models) is applied that executes a contextual analysis of digital content and generates a determination as to whether digital content (or a portion thereof) may be synthetic media. Notifications are automatically generated and provided for rendering across any host application/service endpoints that provide a representation of the digital content. This includes future representations of digital content. Automated generation and transmission of synthetic media detection determinations are aimed at combatting disinformation and subsequent presentation of untrusted/unauthenticated digital content, for example, that which was digitally altered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates an exemplary system diagram of components interfacing to enable synthetic media detection determinations and management of notifications thereof, with which aspects of the present disclosure may be practiced.

FIG. 2 illustrates an exemplary method related to management of synthetic media detection determinations and notifications thereof, with which aspects of the present disclosure may be practiced.

FIG. 4 illustrates a computing system suitable for implementing processing operations described herein related to management of synthetic media detection determinations and notifications thereof, with which aspects of the present disclosure may be practiced.

DETAILED DESCRIPTION

Figure 1B:
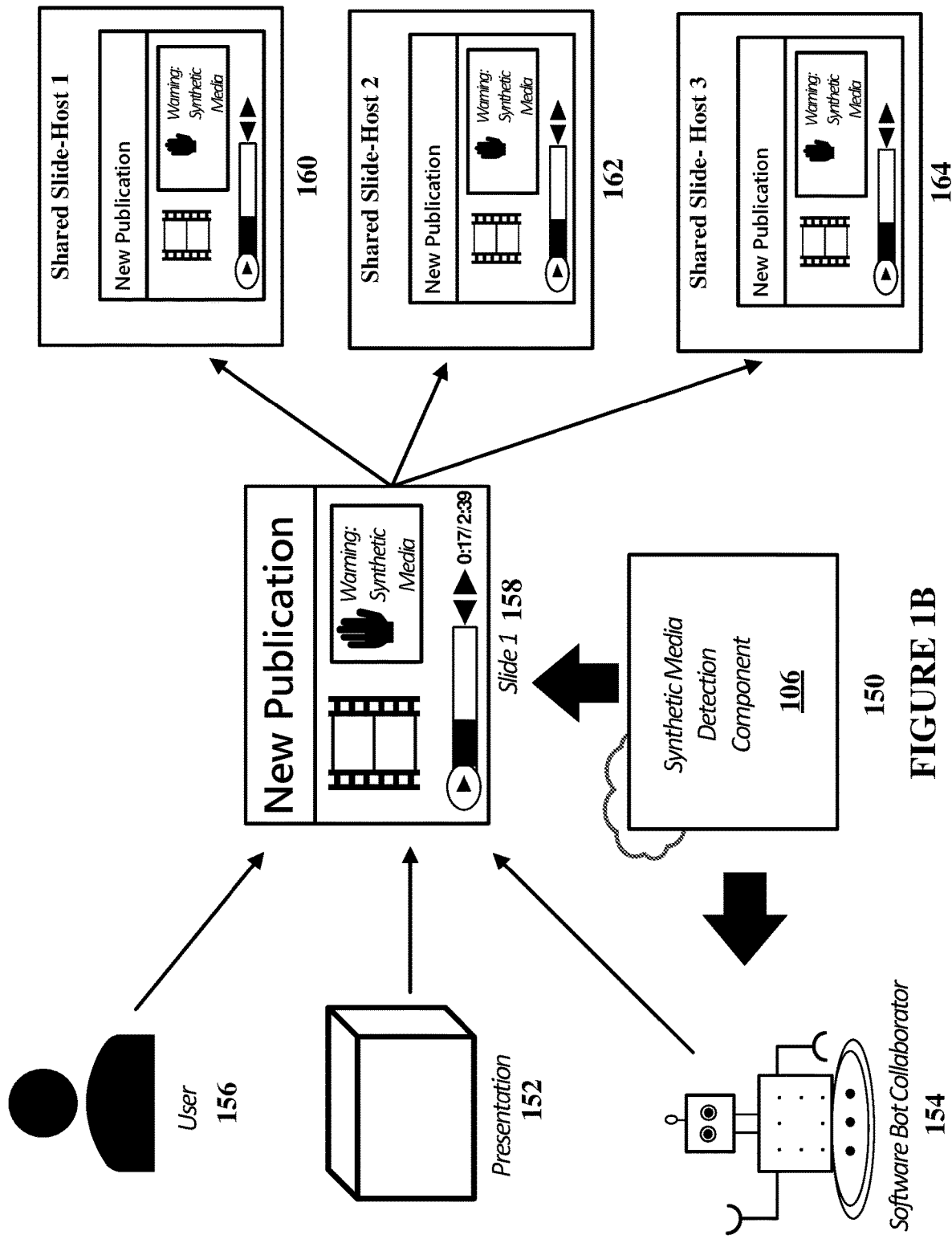
FIG. 1B illustrates an exemplary process flow related to processing of an exemplary synthetic media detection component, with which aspects of the present disclosure may be practiced.

As identified in the foregoing, the present disclosure relates to management of synthetic media detection determinations and automatic generation of notifications thereof. Synthetic media is a catch-all term for the artificial production, manipulation and modification of data corresponding with content by automated means, especially through AI algorithms. Synthetic media, as described herein, is intended to cover any digital content that comprises characteristics identified as being digitally manipulated (e.g., via a computer program/algorithm) as compared with a prior representation of the digital content. A prior representation of digital content is intended to cover any technical instances where a prior version of the digital content has been rendered, which further comprises original versions of digital content that may have been rendered and distributed. Non-limiting examples of content types of synthetic media comprise but are not limited to: video; images; audio; text/written content; content tables; charts and/or graphs; and handwritten input/signatures, among other examples. Commonly, synthetic media is generated for the purpose of misleading people or changing an original meaning. Fears of synthetic media include the potential to supercharge fake news, the spread of misinformation, distrust of reality, mass automation of creative and journalistic jobs, and potentially a complete retreat into AI-generated fantasy worlds.

Processing of the present disclosure provides a synthetic media detection component, configurable to be integrated with a plurality of host application/services, where the synthetic media detection component is adapted to work as a trust factor that automatically generates predictive determinations (e.g., synthetic media detection determinations) as to whether digital content has been digitally altered (e.g., is the content real or fake). Synthetic media detection determinations of the present disclosure comprise predictive determinations as to whether digital content (e.g., a content portion or a plurality of content portions) are synthetic media. Automated generation and transmission of synthetic media detection determinations are aimed at combatting disinformation and subsequent presentation of untrusted/ unauthenticated digital content, for example, that which was digitally altered. In doing so, trained AI processing (one or more trained AI models) is applied that executes a contextual analysis of digital content and generates a determination as to whether digital content (or a portion thereof) may be synthetic media. In one example, trained AI processing applies a trained AI bot that acts as trust factor for generating synthetic media detection determinations from contextual analysis of digital content. A trained AI bot can be automatically applied to analyze any digital content that is presented through a host application/service endpoint. In other technical instances, a graphical user interface (GUI) of a host application/service is adapted to provide GUI features that enable users to control application of the trained AI bot to selectively apply trust factor authentication of digital content. Notifications are automatically generated and provided for rendering across any host application/service endpoints that provide a representation of the digital content. This includes future representations of digital content.

For ease of explanation, the present disclosure may reference slide-based digital content (e.g., slide-based template or displayed slide) as a representation of digital content. However, it is to be recognized that the present disclosure applies to any format of digital content, where content portions of digital content can be analyzed to generate synthetic media detection determinations. In one example, synthetic media detection determinations are generated offline prior to subsequent presentation of digital content through a host application/service endpoint. In other examples, synthetic media detection determinations are generated during real-time (or near real-time) execution of host application/service endpoints.

In one non-limiting example, a content portion of a slide-based template is detected that is presented in a slide-based presentation service. This is a trigger for applying a trained AI model that is adapted to generate a determination (e.g., synthetic media detection determination) as to whether the content portion is synthetic media. In doing so, the trained AI model executes processing operations that comprise executing a contextual analysis of the content portion, which comprises analysis of data of the content portion for which a synthetic media detection determination is to be generated. Execution of a contextual analysis comprises generating a confidence scoring metric indicating a likelihood that the content portion is (or is not) synthetic media based on a result of the contextual analysis. The trained AI model further generates a determination as to whether the content portion is synthetic media based on a result of analyzing the confidence scoring metric. As a result of that contextual analysis, a GUI notification is automatically generated that comprises a determination as to whether the content portion is synthetic media. In some technical instances, data for rendering the GUI notification is automatically transmitted to one or more host services, which include the slide-based presentation application/service that presents the content portion. In other technical instances (e.g., where a contextual analysis is being executed on a computing device used to present a representation of a host application/service endpoint), the GUI notification is automatically rendered in one or more host services including the slide-based presentation service. For example, the GUI notification is automatically rendered within the slide-based template proximate to the content portion.

As referenced in the foregoing, some alternative examples of the present disclosure comprise adaptation of a GUI of a host application/service endpoint, where application command control of a GUI comprises a GUI feature that enables users to control application of the trained AI bot to selectively apply trust factor authentication of digital content. For example, the detection of the content portion of the slide-based template occurs based on a receipt of an indication of a user action that selects a GUI feature configured to automatically initiate processing to generate the determination as to whether the content portion is synthetic media. This provides a user with control as to when to execute a synthetic media detection determination, so as not to inundate a user with unwanted notifications. Furthermore, a GUI of a host application/service (and associated endpoints) can be further adapted to provide settings for users to control how/when exemplary notifications should be surfaced for a user (or group of users).

With respect to execution of contextual analysis of a content portion, for generation of synthetic media detection determinations, a trained AI model is configured to: identify a content type of the content portion. The content portion is then segmented into chunks. Processing to segment a content portion into chunks may occur based on identification of the type of content portion. For instance, a video or audio clip may be segmented into frames (or groups of frames), whereas image content is segmented into layers (e.g., foreground, background, scenes) and/or objects (e.g., persons, places, things). Alternatively, a content table or spreadsheet document may be segmented into rows and/or columns, cells, etc., which can be further analyzed. Segmentation processing enables a thorough analysis of data attributes of individual chunks of a content portion but also a comparative analysis of chunks of a content portion (e.g., comparative evaluation to determine if there are any indications of digital modification. In one example, areas of interest of each of the chunks of the content portion are identified. In an example where a content portion is image content, an area of interest may be facial features of persons identified in the image content. A comparative analysis of data attributes in each of the chunks occurs relative to the area of interest identified for each of the chunks. As an example, one or more segmented content portions can be comparatively analyzed to determine whether there has been any digital alterations that constitute synthetic media. The confidence scoring metric is then generated based on a result of the comparative analysis of the data attributes in each of the chunks of the content portion.

In other examples, data attributes are analyzed comparative to reference resources. For example, a textual content portion can be separated into sections, where data (and metadata) of a section of content can be compared against one or more resources accessed via a network connection (e.g., the Internet). In one example, references resources are user-specific (e.g., previous written content/handwritten content of a user, voice-recognition analysis of the user). In other examples, reference resources are authoritative works that pertain to specific types of information, people, facts ideas, etc. For instance, a reference resource for a textual content portion may be a dictionary or thesaurus. In another instance, a spoken sentence of a speech or even a fact of a speech (or written article) can be analyzed to determine the authenticity and/or accuracy. In further examples, a plurality of reference resources is utilized to comparatively evaluate a content portion. As an example, if a determination is evaluating whether a content portion is fake news, a plurality of trusted news outlets may be analyzed to determine the credibility of the content portion. It is to be understood that reference resources as described herein are specific to the type of content being evaluated and comprise any digital content, accessible over the Internet, that may be comparatively evaluated against the content portion. Reference resources may be stored and/or accessed via knowledge repositories of the present disclosure. In an example where one or more reference resources are being utilized in a synthetic media detection determination, a comparative analysis of data attributes of an area of interest, in each of the chunks of the content portion, occurs relative to one or more references resources. As a result, an exemplary confidence scoring metric is generated based on a result of the comparatively analyzing of the data attributes of the area of interest, in each of the chunks of the content portion, to the reference resource.

Non-limiting examples of data attributes depend on the content type of the content portion being analyzed. In some technical instances, a plurality of trained AI models is generated that are each adapted to a specific content type of digital content. In one example, processing applied comprises selecting, from a plurality of trained AI models, a trained AI model that is adapted to analyze a specific content type of digital content. For example, the data attributes of each of the chunks of the content portion comprise pixel values of the area of interest and neighboring pixel values of pixels surrounding the area of interest. In such an example, the data attributes of each of the chunks of the content portion further comprise two or more of: shading associated with the area of interest, shadowing associated with the area of interest, lighting associated with the area of interest, transitions between frames in each of the chunks, and metadata associated with each of the chunks.

In additional technical instances, multiple trained AI models are applied. Strategic application of trained AI modeling may be dependent on the type of content being evaluated. For instance, if a video clip is being evaluated that comprises compressed video data, multiple trained AI models are applied that accurately and efficiently detect any synthetic media alterations. At a first level, segmented digital content (e.g., compressed video frames) may be prepared evaluation purposes. In a video frame example, video frames may undergo image processing (e.g., light image processing, rescaling, zooming, orientation changes) as preparation for comparative frame analysis. At a second level, multiple trained AI models may be applied to comparatively analyze segmented digital content. In one technical instance, two trained AI models are applied that comprise a convolutional neural network (CNN) and a long short-term memory (LSTM) network. An exemplary CNN is adapted to automatically extract features from sequential segments/chunks of digital content (e.g., sequential video frames). Training of a CNN for feature extraction and analysis is dependent on the type of digital content being evaluated, where a CNN is adapted to focus on specific data attributes of digital content, where examples of data attributes are subsequently described. An LSTM network is applied for processing of time-series data (e.g., sequential video frames), where an exemplary LSTM network is adapted to detect inconsistencies in the frames of the segmented digital content. Training of an LTSM is dependent on the type of digital content being evaluated, where an LTSM is adapted to focus on specific data attributes of digital content, where examples of data attributes are subsequently described. The application of multiple trained AI models (e.g., in the configuration described above) enables efficient and accurate detection of any potential instances of synthetic media as well as identification of specific locations of potent instances of synthetic media. Latency of generating synthetic media detection determinations if further reduced through the application of multiple trained AI models, which makes the present disclosure extremely useful for real-time evaluation of digital content.

Furthermore, non-limiting examples of the present disclosure can generate different types of GUI notifications to notify users whether digital content is predicted as being synthetic media. For instance, automatic generation of an exemplary GUI notification further inserts, in the GUI notification any of the following contextual information: data identifying the confidence scoring metric; data indicating a content range of the content portion that is identified as synthetic media; data identifying a rationale supporting the determination as to whether the content portion is synthetic media; GUI features/elements for provision of user feedback relative to a GUI notification; and a combination thereof. Data identifying the rationale supporting a predictive determination is derived from a parameter associated with the contextual analysis. In one technical instance, two or more of the above identified types of contextual information are included in a generated GUI notification. In some examples, different levels of representation of a GUI notification are rendered with different types of contextual information. For instance, a first-level GUI notification presents a synthetic media detection determination. A user may then execute a user action, relative to the first-level GUI notification, to reveal additional contextual information about the synthetic media detection determination.

It is further to be recognized that the present disclosure further describes technical examples where notifications of synthetic media detection determinations may be synchronized through a plurality of different host applications/services (and associated endpoints). For instance, automatic transmission of the data for rendering the GUI notification further comprises: identifying one or more host application/service endpoints in which a representation of the slide-based template is rendered; and transmitting the data for rendering the GUI notification to the one or more host service endpoints identified. An exemplary collaborative framework is implemented to dynamically manage data associated with a representation of digital content, and further synchronize any updates with other representations of the digital content which are either embedded in other host application/service endpoints or are the original source content (e.g., an electronic document, file, digital canvas). An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of digital content (e.g., slide-based presentation deck) is included in an electronic meeting hosted through a collaborative communication application/service). During an instance of the electronic meeting, content portions of digital content are presented, which is a trigger for generation of a synthetic media detection determinations for the content portions. When such predictive determinations are generated, processing occurs to determine any other representations of that digital content, so that exemplary notifications of the present disclosure can be provided to pertinent host application/service endpoints. In such examples, the open-source collaborative framework is utilized to manage states of representations of said digital content (e.g., via data mappings) across a plurality of host applications/services (and associated endpoints). If a representation of the presentation content is embedded inline within other host applications/services, said representations are automatically updated to provide a notification that comprises a result of a synthetic media detection determination. Inline, as referenced in the present disclosure, is intended to refer to technical instances where data is embedded as a content portion (data object), among other content portions, that is displayable within a rendering of a GUI of a host application/service endpoint.

Exemplary technical advantages provided by processing described in the present disclosure comprise but are not limited to: automatic generation of synthetic media detection determinations that help combat disinformation and provide a trust factor for authentication of digital content; automatic generation of notifications of synthetic media detection determinations; automatic rendering and distribution of synthetic media detection determinations across a plurality of host application/service endpoints (including in real-time); application of trained AI processing (e.g., one or more trained AI models) that is adapted to efficiently and accurately generate synthetic media detection determinations; ability to generate a plurality of content-specific trained AI models that can be selectively applied in different contextual situations; implementation of a trained AI bot to automatically execute back-end processing for generation of synthetic media detection determinations; ability to automatically generate and render data insights pertaining to synthetic media detection determinations; improved processing efficiency (e.g., reduction in processing cycles, saving resources/bandwidth) for computing devices when generating predictive determinations related to synthetic media; reduction in latency when generating predictive determinations related to synthetic media; and interoperability to enable components described herein to interface with any type of application/service and any type of digital content, among other technical advantages.

FIG. 1A illustrates an exemplary system diagram 100 of components interfacing to enable synthetic media detection determinations and management of notifications thereof, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in process flow 150 (FIG. 1A), method 200 (FIG. 2) as well as processing described in and associated with visual diagrams of FIGS. 3A-3D and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a synthetic media detection component 106; a component for implementation of trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that is executing a host application or service configured to enable presentation of digital content. For ease of explanation, the present disclosure may reference slide-based digital content (e.g., slide-based template or displayed slide) as a representation of digital content that is presented through an application/service such as a presentation application/service (e.g., MICROSOFT® POWERPOINT®) and/or a collaborative communication application/service (e.g., MICROSOFT® TEAMS®). However, it is to be recognized that the present disclosure applies to any format of digital content, where content portions of digital content can be analyzed to generate synthetic media detection determinations.

As identified in the foregoing, synthetic media is a catch-all term for the artificial production, manipulation and modification of data corresponding with content by automated means, especially through AI algorithms. Synthetic media, as described herein, is intended to cover any digital content that comprises characteristics identified as being digitally manipulated (e.g., via a computer program/algorithm) as compared with a prior representation of the digital content. A prior representation of digital content is intended to cover any technical instances where a prior version of the digital content has been rendered, which further comprises original versions of digital content that may have been rendered and distributed. Non-limiting examples of content types of synthetic media comprise but are not limited to: video; images; audio; text/written content; content tables; charts and/or graphs; and handwritten input/signatures, among other examples. Commonly, synthetic media is generated for the purpose of misleading people or changing an original meaning. Fears of synthetic media include the potential to supercharge fake news, the spread of misinformation, distrust of reality, mass automation of creative and journalistic jobs, and potentially a complete retreat into AI-generated fantasy worlds.

Furthermore, user computing device(s) 102 may be specifically configured to enable rendering GUI representations of host applications/services (and associated endpoints). For instance, a representation of digital content is rendered in a GUI of a host application/service endpoint that is rendered via a user computing device 102. In doing so, the user computing device(s) 102 interfaces with the application/service component 104 to enable presentation of a GUI of a host application/service endpoint. Presentation and/or rendering of a host application/service endpoint further extends to technical examples where additional devices (e.g., peripheral devices) are connected with the user computing device 102. In one instance, one or more display devices are connected with a user computing device 102, where the GUI of a host application/service is rendered, via the user computing device 102, on the display device. In other technical instances, a display device is integrated within a user computing device 102.

An application/service component 104 may be configured to manage data associated with host applications/services, including rendering of a GUI of a host application/service endpoint, through interfacing with one or more of: a user computing device 102; a synthetic media detection component 106; a component for implementation of trained AI processing 108; and knowledge repositories 110. A host application/service configured to enable execution of tasks by one or more user accounts. Non-limiting examples of host applications/services that are applicable in the present disclosure comprise but are not limited to: open-source collaborative framework applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/services; social networking applications/services; educational learning applications/services; and suites of applications/services that may collectively comprise a combination of one or more of the previously mentioned applications/services, among other examples. The application/service component 104 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

The application/service component 104 is further configured to present, through interfacing with other computer components of system diagram 100, an adapted GUI that provides user notifications, GUI menus, GUI elements, etc., to manage integration of synthetic media detection determinations into a GUI of a host application/service endpoint. This comprises GUI features/enables that enable user control over when to apply a trained AI bot to generate synthetic media detection determinations as well as GUI features pertaining to management of exemplary GUI notifications rendered in a GUI of a host application/service endpoint. Through a GUI of an application or service, management of synthetic media detection determinations can be provided through any type of GUI element including but not limited to: digital documents; GUI callouts; banners; notifications; messages; and GUI menus and windows, among other examples. Non-limiting visual examples of an improved GUI, and GUI elements provided therein, are illustrated in process flow 150 (FIG. 1B) and the illustrations in processing device views shown in FIGS. 3A-3D. In further technical instances, an application/service component 104 manages provision of notifications across a plurality of different modalities. User preferences may indicate a preference to receive exemplary notifications in a preferred format and/or via a preferred host application/service endpoint. For instance, notifications can be provided through a GUI of an operating system (OS); via a notification center of an OS: within specific host application/service endpoints; and in a specific contextual format (e.g., via email, message, GUI notification). This type of processing may occur via analysis of signal data, where trained AI processing is further adapted to generate relevance determinations (e.g., relevance scoring/ranking) to select an appropriate medium/modality for rendering of an exemplary GUI notification.

Contextual signal data may be collected and analyzed to enhance processing described herein including contextual evaluations for generating synthetic media detection determinations; contextual evaluations for determining how to format an exemplary notification (e.g., one or more representation levels and/or the types of content provided in a GUI notification); and the means (e.g., modality and format) of provision of a GUI notification, among other examples. That is, contextual signal data may be further analyzed to aid with determinations executed by one or more trained AI models. Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services including data (and metadata) associated with specific digital content. Application-specific signal data may comprise not only current signal data instances, but also past usage of an application or service by one or more users. As an example, signal data may pertain to interactions received relative to specific types of digital content. For instance, users may interact with: features of a host application/service during presentation of digital content.

It is further to be recognized that the application/service component 104 is also configured to manage representations of digital content, comprising notifications of synthetic media detection determinations, which may be synchronized through a plurality of different host applications/services (and associated endpoints). An exemplary collaborative framework is implemented to dynamically manage data associated with a representation of digital content, and further synchronize any updates with other representations of the digital content which are either embedded in other host application/service endpoints or are the original source content (e.g., an electronic document, file, digital canvas). An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of digital content (e.g., slide-based presentation deck) is included in an electronic meeting hosted through a collaborative communication application/service). During an instance of the electronic meeting, content portions of digital content are presented, which is a trigger for generation of a synthetic media detection determinations for the content portions. When such predictive determinations are generated, processing occurs to determine any other representations of that digital content, so that exemplary notifications of the present disclosure can be provided to pertinent host application/service endpoints. In such examples, the open-source collaborative framework is utilized to manage states of representations of said digital content (e.g., via data mappings) across a plurality of host applications/services (and associated endpoints). If a representation of the presentation content is embedded inline within other host applications/services, said representations are automatically updated to provide a notification that comprises a result of a synthetic media detection determination. Inline, as referenced in the present disclosure, is intended to refer to technical instances where data is embedded as a content portion (data object), among other content portions, that is displayable within a rendering of a GUI of a host application/service endpoint.

In addition to managing data storages related to content of a distributed collaborative canvas, the application/service component 104, through interfacing with the synthetic media detection component 106, a component for implementation of trained AI processing 108 and/or knowledge repositories 110, is adapted to manage mappings of representations of digital content relative to the provision of a notification of a synthetic media detection determination. For lookup purposes to maintain correlation amongst different representations of digital content, mappings are created correlate representations of digital content to generated synthetic media detection determinations. For instance, data associated with digital content comprises but is not limited: an identification of the digital content (ID); markers indicating positioning/location of a component (e.g., start/end range of content portion); identification of content types and/or positioning/formatting of digital content (e.g., lines, rows, columns, sizing); timestamp data related to creation and management of digital content and/or representations thereof; and user account access relative to digital content, among other examples. Other data that may be stored as part of an exemplary data mapping may comprise but is not limited to: data/metadata indicating user accounts associated with digital content; data/metadata indicating content updates to digital content and indications of user accounts that performed respective updates; data indicating message notifications pertaining to digital content; data/metadata indicating mapping between representations of digital content and synthetic media detection determinations; and data/metadata indicating comments, tasks, reminders, etc., associated with a digital content, among other examples. Any of the previously mentioned examples may be included in an individual or collective dating mapping, where a data mapping can be used to aid contextual analysis for providing synchronization update to a representation of digital content. The application/service component 104 may interface with other components of system diagram 100 to enable querying of data mappings which can aid processing determinations for providing synchronization updates. Furthermore, a programmed software module and/or trained AI processing may be adapted to obtain and utilize any of the above identified data pertaining to a data mapping (individually or in combination) to aid relevance processing for determining how to generate a representation of digital content including distribution of a notification related to a synthetic media detection determination. A trained AI model (e.g., machine learning model) may be trained to correlate data associated with a data mapping with user context data (e.g., including user activity current or past user activity and/or user preferences) to automatically generate determinations that aid contextually relevant notification generation. Additionally, exemplary knowledge repositories 110, as subsequently described, may store data needed to execute any processing operations described herein, including data mappings generated by the application/service component 104.

As previously referenced, trained AI processing (e.g., one or more trained AI models) is applied to execute a contextual analysis of a presentation, including signal data received during the presentation. This may comprise signal data received through user gestures, analysis of user speech, content added (e.g., via an inking layer and/or an augmented content layer) by users during the presentation. Analyzing of signal data, including user-specific signal data, occurs in compliance with user privacy regulations and policies. For instance, users may consent to monitoring of signal data to improve user experience and operation of applications/services associated with a software data platform. Through execution of trained AI processing, automatic determinations may be generated to automatically to manage notifications of synthetic media detection determinations.

The synthetic media detection component 106 is one or more components adapted to work as a trust factor that automatically generates predictive determinations (e.g., synthetic media detection determinations) as to whether digital content has been digitally altered (e.g., is the content real or fake). Synthetic media detection determinations of the present disclosure comprise predictive determinations as to whether digital content (e.g., a content portion or a plurality of content portions) are synthetic media. Automated generation and transmission of synthetic media detection determinations are aimed at combatting disinformation and subsequent presentation of untrusted/unauthenticated digital content, for example, that which was digitally altered. In doing so, trained AI processing is applied that executes a contextual analysis of digital content and generates a determination as to whether digital content (or a portion thereof) may be synthetic media. In one example, trained AI processing applies a trained AI bot that acts as trust factor for generating synthetic media detection determinations from contextual analysis of digital content. A trained AI bot can be automatically applied to analyze any digital content that is presented through a host application/service endpoint. In other technical instances, a graphical user interface (GUI) of a host application/service is adapted to provide GUI features that enable users to control application of the trained AI bot to selectively apply trust factor authentication of digital content. Notifications are automatically generated and provided for rendering across any host application/service endpoints that provide a representation of the digital content. This includes future representations of digital content. Examples of processing operations executed by the synthetic media detection component 106 (and/or interaction with the component for implementation of trained AI processing 108), comprise but are not limited to processing operations described in present disclosure including system diagram 100 (FIG. 1A), diagram 150 (FIG. 1B), method 200 (FIG. 2), and those described in the description of FIGS. 3A-3D. For readability of the present disclosure, those processing operations are not explicitly restated in the description of synthetic media detection component 106 but are understood to be executed thereby.

The synthetic media detection component 106 may further be configured to manage application of trained AI processing including building, training, and application of trained AI models (e.g., implemented as trained AI processing provided through component 108). Implementation of trained AI modeling including creating, adapting, training, and updating of a component for implementation of AI processing 108 is known to one skilled in the field of art. Implementation of an AI bot is also known to one skilled in the field of art. Above what is traditionally known, trained AI processing, including implementation of a trained AI bot, is adapted to execute a contextual analysis of digital content to generate synthetic media detection determinations for one or more portions the digital content as well as manage generation of notifications that are tailored to provide data insights resulting from generated synthetic media detection determinations. A trained AI bot can be automatically applied to analyze any digital content that is presented through a host application/service endpoint and further engage a user in dialogue to aid understanding of synthetic media detection determinations. Through connection to knowledge repositories 110, access to a plurality of data resources enable the trained AI bot to tailor communications with specific users as well as provide rich interactive data during dialogue with users.

Trained AI processing may be applicable to aid any type of determinative or predictive processing including specific processing operations described about with respect to determinations, classification ranking/scoring and relevance ranking/scoring. This may occur via any of supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) CNN or recurrent neural network (RNN)); LTSM networks; transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, trained AI processing may be continuously updated over time including based on receipt of user feedback regarding representations of provided through an improved GUI of an application or service.

As previously referenced, some technical instances of the present disclosure apply multiple trained AI models to generate synthetic media detection determinations. Strategic application of trained AI modeling may be dependent on the type of content being evaluated. For instance, if a video clip is being evaluated that comprises compressed video data, multiple trained AI models are applied that accurately and efficiently detect any synthetic media alterations. At a first level, segmented digital content (e.g., compressed video frames) may be prepared evaluation purposes. In a video frame example, video frames may undergo image processing (e.g., light image processing, rescaling, zooming, orientation changes) as preparation for comparative frame analysis. At a second level, multiple trained AI models may be applied to comparatively analyze segmented digital content. At a second level, multiple trained AI models may be applied to comparatively analyze segmented digital content. In one technical instance, two trained AI models are applied that comprise a CNN and a LSTM network. An exemplary CNN is adapted to automatically extract features from sequential segments/chunks of digital content (e.g., sequential video frames). Training of a CNN for feature extraction and analysis is dependent on the type of digital content being evaluated, where a CNN is adapted to focus on specific data attributes of digital content, where examples of data attributes are subsequently described. An LSTM network is applied for processing of time-series data (e.g., sequential video frames), where an exemplary LSTM network is adapted to detect inconsistencies in the frames of the segmented digital content. Training of an LTSM is dependent on the type of digital content being evaluated, where an LTSM is adapted to focus on specific data attributes of digital content, where examples of data attributes are subsequently described. The application of multiple trained AI models (e.g., in the configuration described above) enables efficient and accurate detection of any potential instances of synthetic media as well as identification of specific locations of potent instances of synthetic media. Latency of generating synthetic media detection determinations if further reduced through the application of multiple trained AI models, which makes the present disclosure extremely useful for real-time evaluation of digital content.

Knowledge repositories 110 may be accessed to obtain data for generation, training and implementation of trained AI processing as well the operation of processing operations by that of the application/service component 104 and the synthetic media detection component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the presentation feed management component 106 and/or the trained AI processing.

In implementation, knowledge repositories 110 may be data stored on a distributed data storage that is accessible over a network connection. However, in some examples, data described with respect to knowledge repositories 110 may be stored locally on a computing device. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored representations of data insight suggestions; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing and transcription processing including user context analysis to derive a current context of a user communication (e.g., evaluation of user speech, written content and/or gestures). The cloud-assistance service may provide the synthetic media detection component 106 and/or application/service component 104 with access to larger and more robust library of stored data for execution of language understanding/natural language understanding processing including transcribing audio signals received from users/participants, optical recognition processing and/or gesture evaluation (including intent of a gesture). Access to the cloud-assistance service may be provided when an application/service is accessing content in a distributed service-based example (e.g., a user is utilizing a network connection to access an application/service), as the data of the cloud-assistance service may be too large to store locally. In further examples, the synthetic media detection component 106 may be configurable to interface with a web search service, entity relationship databases, etc., to extend a corpus of data to make the most informed decisions when generating determinations related to contextual analysis of digital content for generation of synthetic media detection determinations. In further examples, telemetry data may be collected, aggregated and correlated (e.g., by an interfacing application/service) to further provide components of system diagram 100 with on-demand access to telemetry data which can aid determinations generated thereby including generation of data insights associated with synthetic media detection determinations.

FIG. 1B illustrates an exemplary process flow 150 related to processing of an exemplary synthetic media detection component 106 (of FIG. 1A), with which aspects of the present disclosure may be practiced. Process flow 150 illustrates the implementation of a trained AI bot (e.g., "Software Bot Collaborator") that is adapted to execute contextual analysis of digital content to generate synthetic media detection determinations and GUI notifications thereof. In the example shown in process flow 150, digital content is a presentation 152 comprising slide-based content. For instance, presentation 152 is a slide-based presentation deck that comprises a plurality of slides comprising digital content displayed for presentation. However, it is to be recognized that process flow 150 applies to any form of digital content as known to one skilled in the field or art.

The synthetic media detection component 106 is configured to execute software bot collaborator 154, which is a trained AI bot adapted to execute processing to generate one or more synthetic media detection determinations for digital content (in this case presentation 152). In doing so, the software bot collaborator 154 automatically applies processing operations described herein including those described in system diagram 100 (FIG. 1A), method 200 (FIG. 2) and the description of FIGS. 3A-3D. In one example, the software bot collaborator 154 generates synthetic media detection determinations offline prior to subsequent presentation of presentation 152 through a host application/service endpoint. In other examples, the software bot collaborator 154 generates synthetic media detection determinations during real-time (or near real-time) presentation of presentation 152 via a host application/service endpoint.

Furthermore, process flow 150 illustrates an interaction between a user 156 with presentation 152. For instance, user 152 creates and edits the digital content of presentation 152. This may comprise including content portions that the user may have imported from other applications/services and/or users. As such, there may be digital content that the user 156 is unsure if a specific content portion is synthetic media which has been digitally altered. In the example shown in process flow 150, user 156 is accessing a slide 158 ("Slide 1") of presentation 152 (e.g., slide-based presentation deck). Slide 158 comprises a video object that is unauthenticated from the perspective of determining whether (or not) the video object is synthetic media. The software bot collaborator 154 is adapted to execute a contextual analysis of the video object and/or other associated digital content of the slide 158 to generate a synthetic media detection determination. As indicated in the foregoing, this processing may occur through a user interaction with a GUI element in a host application/service endpoint, where the user 156 would select a GUI feature to initiate the contextual analysis. This can occur during a design phase used to create digital content of presentation 152 or during a presentation phase where the slide 158 is being presented in real-time (or near real-time) through a GUI of a host application/service endpoint. In alternative examples, the software bot collaborator 154 is automatically applied to execute the contextual analysis without requiring a user request. In some technical instances, this may occur based on analysis of signal data, including application-specific signal data, that indicates a mode associated with the presentation 152. For example, if the user 156 is an audience member and is viewing the slide 158 in a presentation mode (e.g., of a presentation application/service), it is more likely the user is engaged in following the speech of a presenter and/or the digital content of the slide 158. As such, it is beneficial for the software bot collaborator 154 to automatically execute a synthetic media detection determination and further automatically generate (and enable rendering) of a GUI notification that presents the synthetic media detection determination without requiring an explicit user request. In another example, user 156 may be the presenter of presentation 152 including slide 158. In that instance, user 156 may have control over the presentation of slide 158, which may be an opportunity for the user to provide input (user action) to initiate processing by the software bot collaborator 154. Above all, it should be recognized that a contextual evaluation of a state of a presentation 152 may help determine whether to automatically apply contextual analysis or wait for a user action explicitly requesting generation of a synthetic media detection determination. For instance, a trained AI model (or trained AI models) may be adapted to execute analysis of exemplary signal data, as previously described, to determine how the software bot collaborator 154 should proceed.

Slide 158 further illustrates the result of a synthetic media detection determination as generated by the software bot collaborator 154. The result is an exemplary GUI notification that comprises data insights pertaining to the synthetic media detection determination. As indicated in the foregoing description, trained AI processing (e.g., the software bot collaborator 154) may further determine how to present said data insights to user 156 within a GUI notification. In some examples, a format of a GUI notification, including the data insights provided therein, can be tailored for user 156. This may occur based on contextual analysis described herein including the signal data associated with user 156 (current usage of applications/services and/or historical patterns/user preferences of user 156 for receipt of GUI notifications). In the example shown in process flow 150, a GUI notification is presented in slide 158 that provides a result of the contextual analysis by the software bot collaborator 154 which indicates that the video object (in slide 158) is synthetic media.

Moreover, process flow 150 further illustrates that notifications of synthetic media detection determinations may be synchronized through a plurality of different host applications/services (and associated endpoints). As previously referenced, data mappings may be managed that associate digital content, associated with a synthetic media detection determination, with different representations of content that may be embedded in different host applications/services (and associated endpoints). For instance, user 156 may be presenting presentation 152 in a presentation application/service, where another representation of slide 158 is embedded in a message thread of a collaborative media application/service, an email in an email application/service, a word processing document, etc. Generation and rendering of a GUI notification in slide 158 creates an automatic trigger to synchronize that version of slide 158 with representations embedded in other host applications/services (and associated endpoints). As visually illustrated in FIG. 1B, other representations of slide 158, respectively labeled as 160, 162 and 164, are automatically updated in other host application/service endpoints to synchronize with the original representation of slide 158. In said examples, the other representations (160, 162 and 164) are automatically updated to provide the GUI notification comprising a result of the synthetic media detection determination. It is further to be recognized that contextual analysis, including signal data described herein, can be further utilized to tailor the other representations (160, 162 and 164) in a contextually relevant manner for a specific host application/service (and associated endpoint). That is, in some alternative examples, a GUI notification comprising a synthetic media detection determination may comprise different data insights depending on the context in which the GUI notification is being inserted. In such technical instances, exemplary data mappings may be maintained to keep track of the GUI notifications (and associated content) relative to generated representations of digital content.

FIG. 2 illustrates an exemplary method 200 related to management of synthetic media detection determinations and notifications thereof, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1). Processing operations performed in method 200 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 200 may be executed by a component such as the synthetic media detection component 106 (of FIG. 1A) and/or the component for implementation of the trained AI processing 108 (FIG. 1A). In distributed examples, processing operations described in method 200 may be implemented by one or more computer components connected over a distributed network. For example, computer components may be executed on one or more network-enabled computing devices, connected over a distributed network, that enable access to user communications. It is further to be recognized that an order of execution of processing operations in method 200 may vary without departing from the spirit of the present disclosure. Furthermore, variations of method 200 may be comprise execution of one or more of the processing operations identified in method 200 even omitting some of the processing operations depending on a device and/or system that is executing processing.

Method 200 begins at processing operation 202, where trained AI modeling is generated that is adapted to generate a determination (e.g., synthetic media detection determination) as to whether the content portion is synthetic media. Generation and management of a trained AI model including training of one or more classifiers is known to one skilled in the field of art. Above what is traditionally known, processing operations are executed to adapt a trained AI model to execute a contextual analysis of presentation content comprising a content portion for which a synthetic media detection determination is to be generated. Exemplary processing operations for doing so have been described in the foregoing description including the description of system diagram 100 (FIG. 1A) and process flow 150 (FIG. 1B) and are subsequently described with reference to the description of FIGS. 3A-3D.

Train of AI processing may further comprise generating an AI model that is tuned to reflect specific metrics for accuracy, precision and/or recall before a trained AI model is exposed for real-time (near real-time) usage. Developers may set thresholds for specific metrics to make sure that a trained AI model is operating as expected. Thresholds for metric evaluation of a specific trained AI model may vary, depending on developer specifications, without departing from the spirit of the present disclosure. As an example, thresholds may be set relative to a confidence level (e.g., confidence level metric) generated relative to a synthetic media detection determination. For example, a confidence level score over a certain threshold (e.g., for synthetic media or against synthetic media) may be used to determine whether to predict a content portion as synthetic media.

Once a threshold (or thresholds) is met for exposing a trained AI model, flow of method 200 proceeds to processing operation 204. At processing operation 204, the trained AI modeling is exposed for real-time (or near real-time) evaluation of computing devices.

Flow of method 200 then proceeds to processing operation 206. At processing operation 206, one or more content portions are detected for contextual analysis that results in the generation of a synthetic media detection determination of the one or more content portions. For instance, a content portion is detected during presentation of digital content in real-time (or near real-time). This may comprise technical instances where users are designing/editing an electronic document comprising one or more content portions as well as instances where digital content is presented in a presentation mode through a host application/service endpoint (or integration of multiple host application/service endpoints).

In one non-limiting example, a content portion of a slide-based template (or displayed slide) is detected (processing operation 206) that is presented in an associated endpoint of a host application/service (e.g., slide-based presentation service). This is a trigger for applying a trained AI model (or trained AI models) that is adapted to generate a determination (e.g., synthetic media detection determination) as to whether the content portion is synthetic media. As defined in the foregoing, synthetic media detection determinations of the present disclosure comprise predictive determinations as to whether digital content (e.g., a content portion or a plurality of content portions) are synthetic media. Automated generation and transmission of synthetic media detection determinations are aimed at combatting disinformation and subsequent presentation of untrusted/unauthenticated digital content, for example, that which was digitally altered.

In some examples, processing operation 206 further comprises execution of an initial determination that a synthetic media detection determination has not yet been generated for the content portion. Said determination may comprise analyzing a data mapping identifying whether any prior synthetic media detection determinations have been generated for a specific content portion. Examples of data maintained in an exemplary data mapping has been described in the foregoing. Exemplary data mappings further map digital content (e.g., one or more content portions) to representations thereof that may be embedded in different host application/services (and associated endpoints). In technical instances where it is identified that a synthetic media detection determination has already been generated for a detected content portion, that synthetic media detection determination is used to generate a GUI notification thereof (if one has not already been rendered). In such instances, flow of method 200 may automatically proceed to processing operation 210 to generate an exemplary GUI notification if one has not yet been generated or alternatively proceed to processing operation 212 to provide data for rendering the GUI notification to a host application/service endpoint in examples where a GUI notification was previously generated. In technical instances where a synthetic media detection determination has not yet been generated, flow of method 200 proceeds to processing operation 208.

As referenced in the foregoing, some alternative examples of the present disclosure comprise adaptation of a GUI of a host application/service endpoint, where application command control of a GUI comprises a GUI feature that enables users to control application of the trained AI bot to selectively apply trust factor authentication of digital content. For example, the detection (processing operation 206) of the content portion of the slide-based template occurs based on a receipt of an indication of a user action that selects a GUI feature configured to automatically initiate processing to generate the determination as to whether the content portion is synthetic media. This provides a user with control as to when to execute a synthetic media detection determination, so as not to inundate a user with unwanted notifications.

Once a content portion is detected for contextual analysis, flow of method 200 proceeds to processing operation 208. At processing operation 208, trained AI processing is applied to generate one or more determination(s) indicating whether (or not) the detected content portion(s) are synthetic media. For example, a trained AI model is applied that executes a contextual analysis of digital content (e.g., a content portion) and generates a determination as to whether digital content (or a portion thereof) may be synthetic media. In some instances, this may comprise application of a trained AI bot that acts as trust factor for generating synthetic media detection determinations from contextual analysis of digital content. A trained AI bot can be automatically applied to analyze any digital content that is presented through a host application/service endpoint.

Contextual analysis as described herein comprises analyzing data and metadata associated with a detected content portion. Furthermore, contextual analysis may further factor in other contextual factors associated with a presentation of the content portion, for example, relative to other content portions within a presentation (e.g., slide-based presentation deck). In further examples, signal data associated with a presentation of digital content (e.g., one or more content portions) may further factor into the contextual analysis of the content portion. For example, during a presentation of the content portion, a user may indicate that certain frames of a video clip appear to be digitally altered. This type of information is useful to help a trained AI model confirm a confidence scoring metric generated as a result of a synthetic media detection determination.

Execution of a contextual analysis comprises generating a confidence scoring metric indicating a likelihood that the content portion is (or is not) synthetic media based on a result of the contextual analysis. The trained AI model further generates a determination as to whether the content portion is synthetic media based on a result of analyzing the confidence scoring metric. With respect to specific processing operations related to a contextual analysis of a content portion, a trained AI model is configured to: identify a content type of the content portion. The content portion is then segmented into chunks. Processing to segment a content portion into chunks may occur based on identification of the type of content portion. For instance, a video or audio clip may be segmented into frames (or groups of frames), whereas image content is segmented into layers (e.g., foreground, background, scenes) and/or objects (e.g., persons, places, things). Alternatively, a content table or spreadsheet document may be segmented into rows and/or columns, cells, etc., which can be further analyzed. Segmentation processing enables a thorough analysis of data attributes of individual chunks of a content portion but also a comparative analysis of chunks of a content portion to determine if there are any indications of digital modification. In some technical instances, a plurality of trained AI models is generated that are each adapted to a specific content type of digital content. In one example, processing applied comprises selecting, from a plurality of trained AI models, a trained AI model that is adapted to analyze a specific content type of digital content.

In one example, areas of interest of each of the chunks of the content portion are identified. In general, identification of segments/chunks of a content portion is done so the trained AI model can identify what points of a content portion are most likely to be digitally manipulated. For instance, in a video clip, it can be determined that the first minute of the video clip looks different from the remaining 2 minutes of the video clip. Frames within those identified chunks can be further analyzed to determine if the differences in the scenes of the video clip are due to synthetic media alterations (e.g., in one or more frames). For instance, a grouping of sequential segments/chunks (e.g., video frames) is analyzed comparatively. A trained AI can then focus its training relative to the specific segments/chunks identified to efficiently and accurately generate determinations described herein. As previously referenced, segmentation of content portions into chunks may vary based on the content type. In an example, where a content portion is image content, different parts of the image content can be segmented and analyzed including but not limited to: a foreground, a background, identification of objects, identification of persons, specific portions of a chart/graph, cells of a spreadsheet, rows/columns of a table, etc. Similar types of analysis can be done on frames of a video clip and/or audio clip. For textual content portions, chunks may pertain to specific grammatical structure such as a sentences, paragraphs, sections, etc. With respect to content types such as handwritten input/signatures, pixels indicating letters and/or words (e.g., first and last names) could be analyzed.

Furthermore, for each chunk identified for the content portion, an area of interest may be identified and subsequently analyzed. An area of interest is range of data attributes within a chunk/segment of a content portion that is identified relative to the content type of the content portion. This provides an additional layer of filtering to focus on specific attributes of a chunk of a content portion. Exemplary areas of interest are automatically identified for the content portion based on training processing of a trained AI model relative to an evaluation of similar content types. In some examples, an area of interest is further determined based on a sub-classification of the content type. For instance, if image content is being evaluated, an area of interest may be a grouping of pixels in a certain portion of the image content (e.g., around a face of a person identified in the image content). In that example, a sub-classification of the image content may be that a person is identified in the image content, where training of an AI model is adapted to identify that digital alterations typically occur to faces of users (e.g., via technologies such as deep fakes). In another example, areas of interest in a video clip (or sound clip) may be specific data attributes identified in frames of and/or specific portions of a scene (e.g., a foreground and/or background). Additionally, analysis of an area of interest may further comprise analysis of areas that surround an area of interest (e.g., neighboring pixel values around a face of person in image content). This enables a more comprehensive analysis of an area of interest.

Data attributes that are analyzed in an area of interest of chunks/segments of a content portion depend on the content type of the content portion being analyzed. Exemplary AI models may be adapted to during training to focus on specific data attributes to be analyzed in an area of interest (or area of interests). Non-limiting examples of data attributes analyzed in an area of interest of chunks/segments of a content portion comprise but are not limited to: pixel values of an area of interest (e.g., gradient, coloring); neighboring pixel values surrounding an area of interest; shading associated with the area of interest (and/or an area surrounding an area of interest) including that of specific objects; shadowing associated with the area of interest (and/or an area surrounding an area of interest); lighting associated with the area of interest (and/or an area surrounding an area of interest); orientation of objects; transitions between frames in each of the chunks (e.g., smoothness of transitions, morphing, fading); metadata associated with the content portion and/or each of the chunks (e.g., editing tracking, inclusion of watermarks, digital signatures, grammatical structure of text; vocabulary used in text; resolution and/or size; captioning; identification of inclusion of augmented reality content; voice analysis (e.g., user-specific voice analysis relative to a reference resource for a voice file of a user); and handwritten input analysis (e.g., relative to a reference resource for a signature of a user), among other examples.

In one example, a confidence scoring metric is generated based on a comparative analysis of data attributes in each of the chunks occurs relative to the area of interest identified for each of the chunks. That is, data attributes in areas of interest in each of the chunks of the content portions can be comparatively analyzed to generate a prediction if one or more pixels, frames, paragraphs, etc., appears to synthetic media. For instance, it is determined if any of the data attributes in an area of interest of a chunk appear out of place as compared with data attributes in another chunk (e.g., area of interest within that chunk). Based on that comparative analysis, an overall confidence scoring metric is generated by the trained AI model. In alternative examples, a plurality of confidence scores is generated for a specific content portion (e.g., relative to individual chunks or segments), where a confidence scoring metric is an aggregation of the plurality of confidence scores. This type of analysis may reflect the fact that not all data attributes are created equal and not all discrepancies are indicative of being synthetic media, where an overall analysis of a content portion may be reflective of a synthetic media detection determination.

In other examples, data attributes are analyzed comparative to reference resources, where confidence scoring metrics relate to a comparative analysis between one or more chunks of a content portion and one or more reference resources. For instance, an area of interest of a content portion (or content portions) can be analyzed comparatively relative to a reference resource. This may occur in addition to other relevance analyses previously described or in lieu of the same. For example, a textual content portion can be separated into sections, where data (and metadata) of a section of content can be compared against one or more resources accessed via a network connection (e.g., the Internet). A confidence scoring metric is generated based on result of this analysis. In further examples, references resources are user-specific (e.g., previous written content/handwritten content of a user, voice-recognition analysis of the user). For instance, a user-specific voice model is created and used as a reference resource to compare against audio from a content portion. In this way, voice characteristics (e.g., lexical features and prosodic features) can be analyzed where a confidence scoring metric is generated based on a comparative analysis to determine if there have been digital alterations, voice-overs, etc.

In alternative examples image content and/or frames (e.g., video frames) are compared against a three-dimensional (3D) model that is used as a reference resource. For instance, a 3D model may be created of an area of interest (e.g., object, person (e.g., face), etc.), which can be used as a reference resource to comparatively evaluate movements of the object relative to sequential frames in the content portion. As an example, a 3D model of a persons' face could be created as a reference resource and analyzed to evaluate facial movements of the person on a frame-by-frame basis as a video clip progresses. As such, inconsistencies in facial movements or the like can be identified, using a trained AI model (or models), and used to determine whether content is synthetic media. A confidence scoring metric is generated based on a comparative analysis of the content portion and one or more 3D model reference resources.

In other examples, reference resources are authoritative works that pertain to specific types of information, people, facts ideas, etc. For instance, a reference resource for a textual content portion may be a dictionary or thesaurus, where reference resources are used to evaluate words, phrases, sentence structure, etc., used in writing. This analysis helps predict whether language is user-created (versus machine created), where some AI bots may present content in predetermined formats, language styles, vocabularies, etc., as compared with users. In some further instances, reference resources comprise samples of user-written content, content written by AI bots and/or specific applications/services. A confidence scoring metric is generated based on a comparative analysis of the content portion and one or more text-based reference resources.

In further examples, a plurality of reference resources is utilized to comparatively evaluate a content portion. As an example, if a determination is evaluating whether a content portion is fake news, a plurality of trusted news outlets may be analyzed to determine the credibility of the content portion. It is to be understood that reference resources as described herein are specific to the type of content being evaluated and comprise any digital content, accessible over the Internet, that may be comparatively evaluated against the content portion. Reference resources may be stored and/or accessed via knowledge repositories (e.g., 110 of FIG. 1A) of the present disclosure. In an example where one or more reference resources are being utilized in a synthetic media detection determination, a comparative analysis of data attributes of an area of interest, in each of the chunks of the content portion, occurs relative to one or more references resources. As a result, an exemplary confidence scoring metric is generated based on a result of the comparatively analyzing of the data attributes of the area of interest, in each of the chunks of the content portion, to the reference resource (or plurality of reference resources).

Once one or more synthetic media detection determinations are generated, flow of method 200 proceeds to processing operation 210. At processing operation 210, a GUI notification, comprising data insights associated with a synthetic media detection determination, is generated. As a result of that contextual analysis, a GUI notification is automatically generated (processing operation 210) that comprises a determination as to whether the content portion is synthetic media. Other examples of data insights, relative to a synthetic media detection determination, may further be included in a GUI notification as described in the foregoing description (e.g., system diagram 100, process flow 150) as well as the subsequent description (e.g., the description of FIGS. 3A-3D).

Exemplary GUI notifications can be customized to provide a most contextually relevant GUI notification pertaining to a result of synthetic media detection determination. For instance, automatic generation of an exemplary GUI notification further inserts, in the GUI notification any of the following contextual information: data identifying the confidence scoring metric; data indicating a content range of the content portion that is identified as synthetic media; data identifying a rationale supporting the determination as to whether the content portion is synthetic media; GUI features/elements for provision of user feedback relative to a GUI notification; and a combination thereof. Data identifying the rationale supporting a predictive determination is derived from a parameter (e.g., data attribute) associated with the contextual analysis. In one technical instance, two or more of the above identified types of contextual information are included in a generated GUI notification.

In some examples, different levels of representation of a GUI notification are rendered with different types of contextual information. For instance, first-level GUI notification presents a synthetic media detection determination (e.g., a result of the synthetic media detection determination). Data insights of a first-level GUI notification are intended to provide the user with the necessary information without negatively impacting the user experience by overtaking the slide-based template with the GUI notification. Should the user desire additional context regarding a synthetic media detection determination, the user may then execute a user action, relative to the first-level GUI notification, to reveal a second-level GUI notification providing additional contextual information about the synthetic media detection determination. As referenced in the foregoing remarks, contextual analysis of signal data, including user-specific signal data (e.g., user preferences) may aid a trained AI model in generating a representation of a GUI notification including what data insights to provide there and/or how to format the GUI notification (e.g., provide multiple levels of representation).

In some technical instances, data for rendering the GUI notification is automatically transmitted (processing operation 212) to one or more host applications/services. For instance, this may occur in technical instances where the GUI notification is generated by a different computing device from that which will render the GUI notification in a GUI of a host application/service endpoint. In the example described in method 200, data for rendering a GUI notification is transmitted to the slide-based presentation application/service that presents the slide-based template so that the GUI notification can be rendered within the slide-based template or proximate to the same.

In other technical instances (e.g., where a contextual analysis is being executed on a computing device used to present a representation of a host application/service endpoint), the GUI notification is automatically rendered (processing operation 214) in one or more host services including the slide-based presentation service. This processing may occur in technical instances where the GUI notification is generated by the same computing device that renders the GUI notification in a GUI of a host application/service endpoint. For example, the GUI notification is automatically rendered within the slide-based template proximate to the slide-based template.

Flow of method 200 then proceeds to decision operation 216. At decision operation 216, it is determined whether there is a user interaction received, through a GUI, relative to the GUI notification. Decision operation 216 is pertinent in technical instances were multiple levels of representation of a GUI notification are presentable. For instance, a GUI element may be included in a rendered GUI notification that enables the user to transition from a first-level GUI notification to a second-level GUI notification. In examples where no user interactions are received (or no multi-level representations of a GUI notification are presented), flow of decision operation 216 branches "NO" and method 200 returns to processing operation 206 to initiate generation of a new synthetic media detection determination.

In examples where a user interaction is received relative to the GUI notification, flow of decision operation 216 branches "YES" and method 200 proceeds to processing operation 218. At processing operation 218, a representation of the GUI notification is updated in response to the received user interaction. For instance, a GUI notification may be transitioned from a first-level GUI notification to a second-level GUI notification. In other technical instances, a user may initiate a dialogue with a trained AI bot to gain additional insights into the synthetic media detection determination.

In some technical instances, a GUI notification may comprise a GUI element enabling user feedback relative to a GUI notification and/or the accuracy of the synthetic media detection determination. In such instances, method 200 proceeds to processing operation 220, where user feedback is received. If necessary, flow of method 200 may then return back to processing operation 202, to update a trained AI model based on the received user feedback. In some instances, it is to be recognized that user feedback may not impact operation of a trained AI model.

FIGS. 3A-3D illustrate exemplary processing device views associated with user interface examples for an improved user interface that is configured enable notifications of synthetic media detection determinations, with which aspects of the present disclosure may be practiced. Back-end processing that results in the generation of exemplary GUI notifications has been described in the foregoing description including the description of diagram 100 (FIG. 1A), process flow 150 (FIG. 1B), and method 200 (FIG. 2).

Figure 3A:
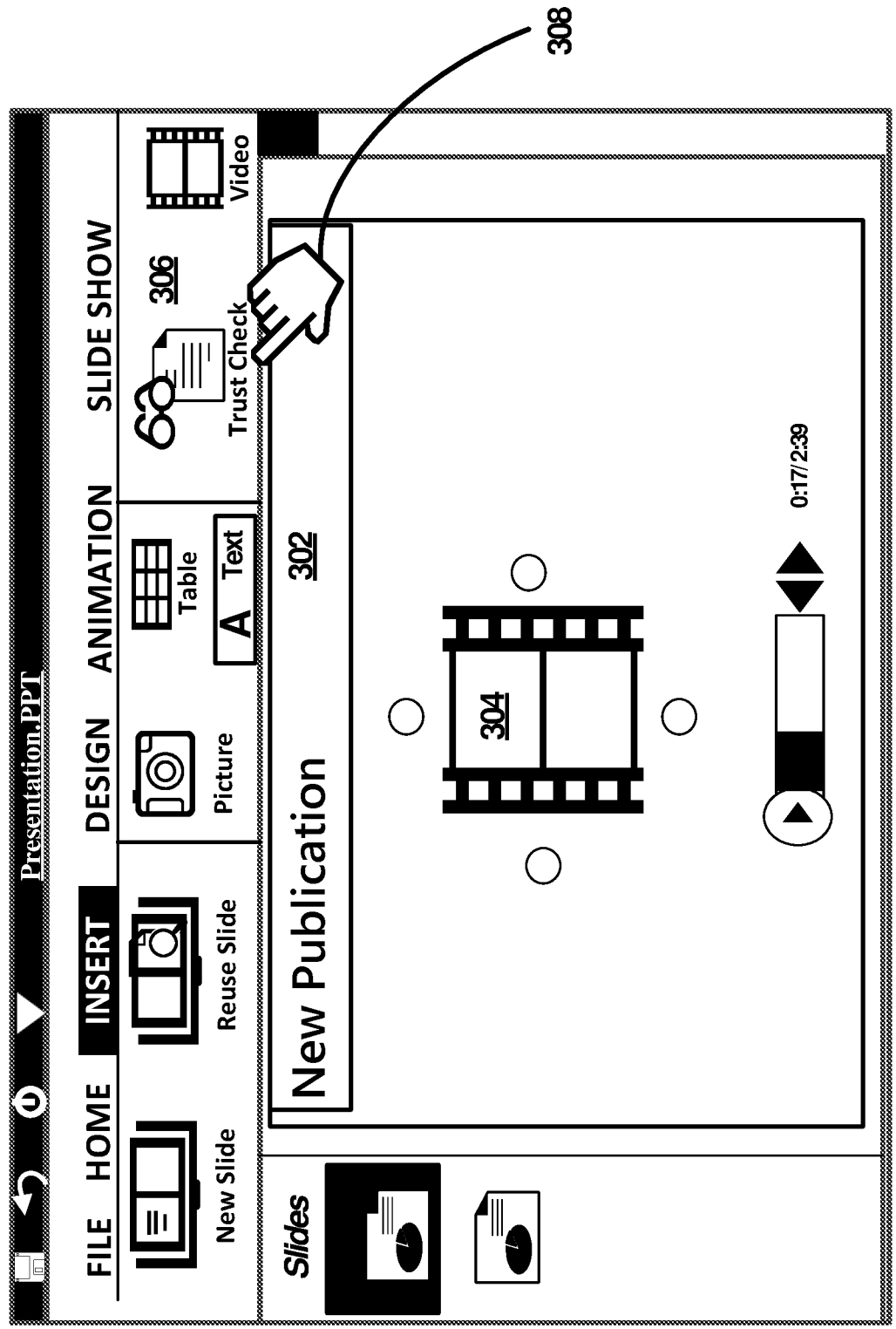
FIGS. 3A-3D illustrate exemplary processing device views associated with user interface examples for an improved user interface that is configured enable notifications of synthetic media detection determinations, with which aspects of the present disclosure may be practiced.

FIG. 3A presents processing device view 300, illustrating an improved GUI of a presentation application/service (e.g., POWERPOINT®) that comprises GUI features to manage authentication of digital content. While a GUI of a presentation application/service is shown in processing device view 300, it is to be recognized that GUIs of any host application/service (and associated endpoint) can be adapted to incorporate GUI features and functionality described herein. In the example shown in processing device view 300, the GUI, of the presentation application or service, displays a slide-based template 302, which is being edited by a user (e.g., in a design mode of the presentation application/service). Within the slide-based template 302, a user adds a video object 304 representing digital content. For instance, a user may have received the video object 304 from another user and inserted into video object 304 as digital content with the slide-based template 302. In that technical instance, the user may be unaware how the video object 304 was created.

The adapted GUI of the presentation application/service comprises, in an application command control, a GUI feature 306 configured to automatically initiate a contextual analysis of digital content to generate a synthetic media detection determination. GUI feature 306 enables a user to control application of the trained AI bot to selectively apply trust factor authentication of digital content. As indicated in the foregoing, alternative examples of the present disclosure apply automatic evaluation of digital content, for example, that has not been previously authenticated with respect to a synthetic media determination.

In the example shown in processing device view 300, a user action 308 is received through the GUI of the presentation application/service. The user action 308 selects GUI feature 306, automatically triggering application of trained AI processing (e.g., a trained AI model) to generate a synthetic media detection determination of the video object 304. A non-limiting example of a result of that processing, including generation of an exemplary GUI notification related to a synthetic media detection determination, is illustrated in FIG. 3B.

Figure 3B:
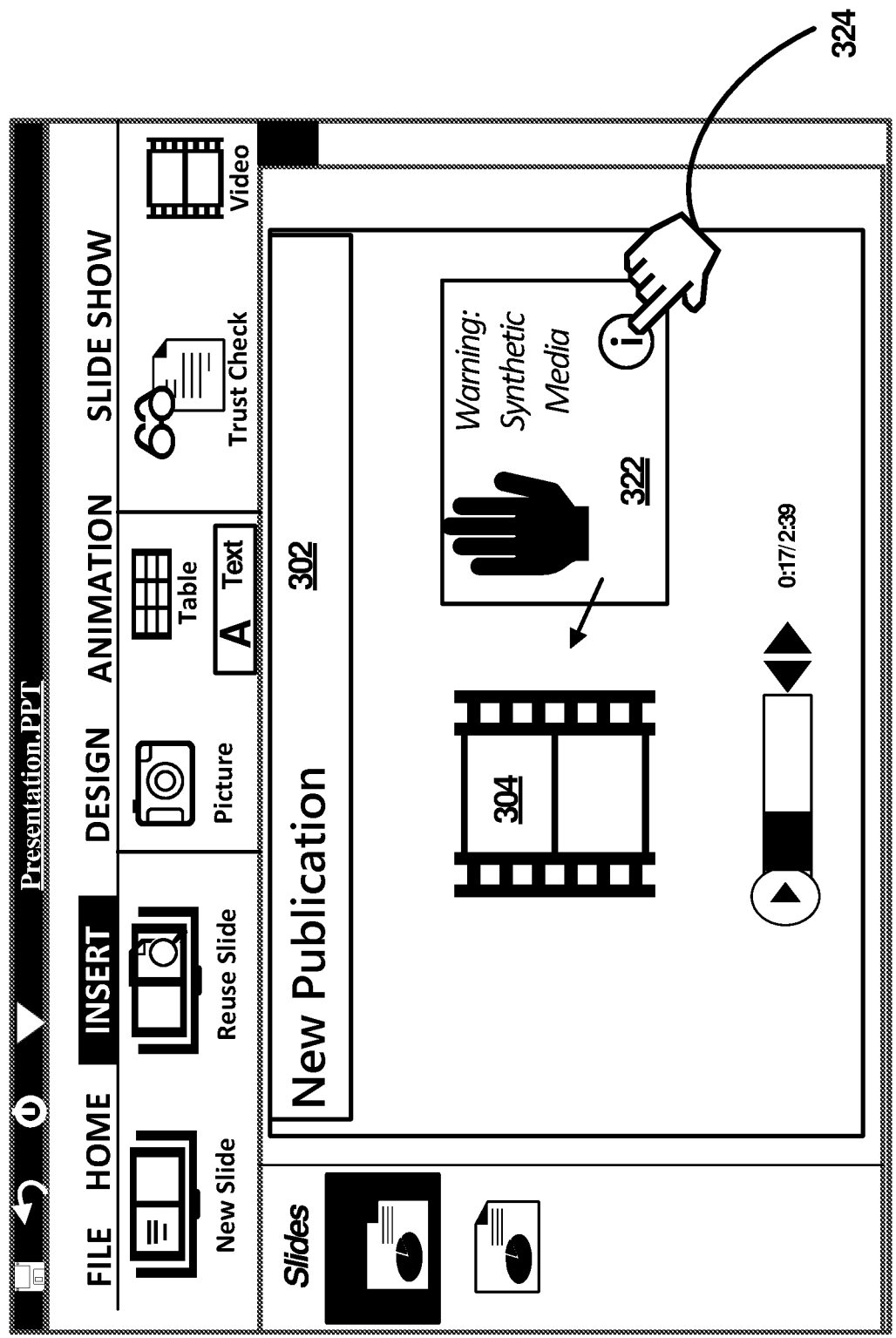

FIG. 3B presents processing device view 320, illustrating a continued example of the slide-based template 302 (of FIG. 3A), where the receipt of user action 308 (FIG. 3A) results in an updated representation of the slide-based template 302. In the example shown in processing device view 320, a GUI notification 322, relative the synthetic media detection determination, is generated and rendering for presentation. As can be seen, the GUI notification 322 is rendered proximate to the video object 304 and further provides visual indication that correlates the GUI notification 322 with the video object 304 for which a synthetic media detection determination is generated. The GUI notification 322 is a non-limiting example of a first-level GUI notification that provides a result of the synthetic media detection determination identifying the video object 304 synthetic media. The first-level GUI notification is intended to provide the user with the necessary information without negatively impacting the user experience by overtaking the slide-based template with the GUI notification 322. The GUI notification 322 further provides a selectable GUI feature enabling the rendering of additional contextual information (e.g., data insights) pertaining to the synthetic media detection determination. In alternative examples, an explicit GUI feature, pertaining to the rendering of additional data insights, is not required to be presented. For instance, user actions such as a hover action, over the GUI notification 322, may result in the presentation of second-level GUI notification pertaining to the synthetic media detection determination. Second-level GUI notifications provide additional data insights and/or contextual information associated with the synthetic media detection determination. Processing device view 320 illustrates a receipt, through the GUI, of user action 324 that selects a GUI feature configured to render additional contextual information about the synthetic media detection determination. A result of that selection is illustrated in FIG. 3C.

Figure 3C:
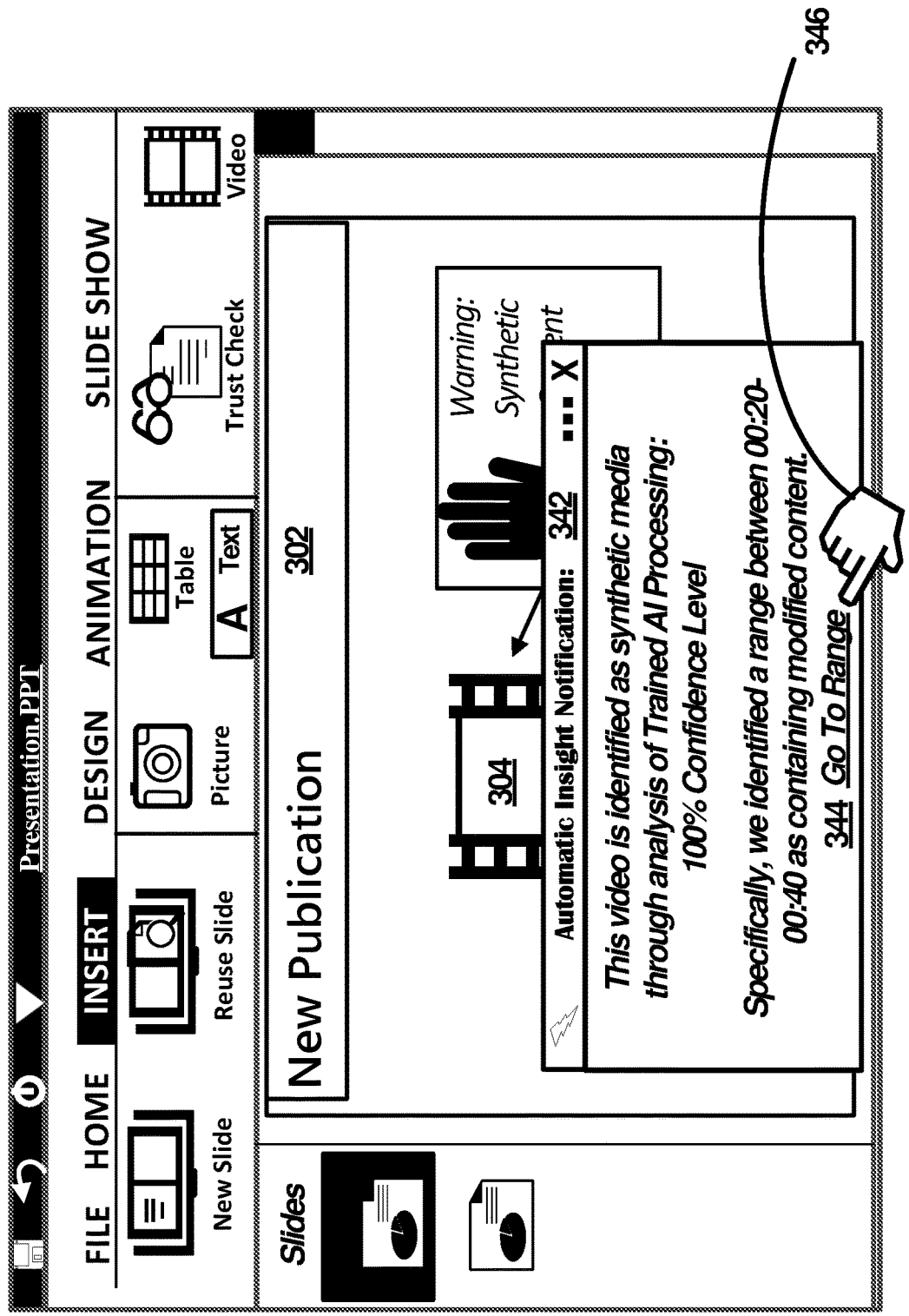

FIG. 3C presents processing device view 340, illustrating a continued example of the slide-based template 302 (of FIG. 3B), where the receipt of user action 324 (FIG. 3B) results in an updated representation of the slide-based template 302. In the example shown in processing device view 340, a second-level GUI notification 342 is automatically provided (as an automatic data insight notification), through the GUI of the presentation application/service, in response to user action 324 (FIG. 3B). The second-level GUI notification 342 provides additional contextual information about the synthetic media detection determination, including specific data insights resulting from a contextual analysis of the video object 304 by a trained AI model. For example, the second-level GUI notification 342 provides a confidence scoring metric indicating a likelihood that the content portion is (or is not) synthetic media derived from a result of the contextual analysis executed by the trained AI model. In the example shown in processing device view 340, an exemplary confidence level metric indicates a one hundred percent (100%) likelihood that the video object 304 is (or is not) synthetic media. Moreover, the second-level GUI notification 342 provides identification of a content range (timestamp 00:20-00:40) of the video object 304 that resulted in the video object being deemed as synthetic media. As identified in the foregoing description, the contextual analysis of digital content (e.g., video object 304) breaks the digital content into segments/chunks which can be analyzed individually and comparatively (with other segments/chunks) to enable identification of specific content ranges which may result in a determination that content is synthetic media. To further improve a user experience and efficiency in execution, the second-level GUI notification 342 further comprises a link 344 that automatically directs a user to the portion of the video object 304 that was identified as synthetic media (e.g., digitally altered). Processing device view 340 further illustrates the receipt, through the GUI of the presentation application/service, of a user action 346 that selects the link 344. In response to receipt of user action 346, an adapted GUI is configured to direct a user to the specific content portion of the video object 304 that is associated with the identified content range.

Figure 3D:
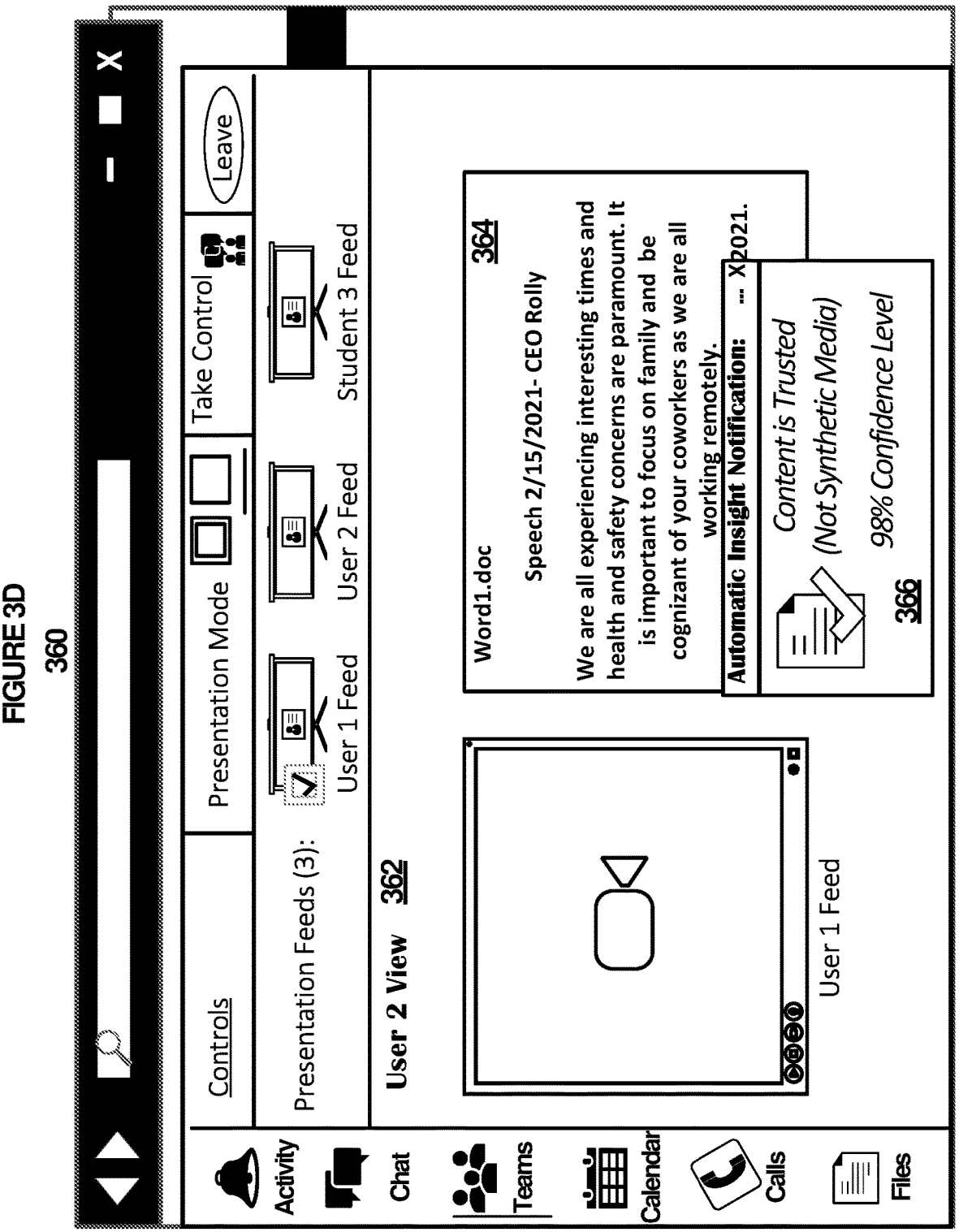

FIG. 3D presents processing device view 360, illustrating an example of an electronic meeting being conducted via a collaborative communication application/service. Processing device 360 is intended to illustrate an example where an exemplary GUI notification, relative to a synthetic media detection determination, is automatically rendered for user (e.g., "User 2") based on a detection of content being presented by another user (e.g., "User 1"). In the example shown in processing device view 360, a presentation feed 362 is presented to "User 2" (e.g., "User 2 Feed") illustrating digital content 364 that is being presented by "User 1" to other meeting participants (e.g., audience members). In response to the presentation of digital content 364 (by "User 1"), a trained AI model is automatically applied to generate GUI notification 366. GUI notification 366 is automatically rendered, without user request, to notify an audience member ("User 2") that the digital content 364 being presented is trusted (e.g., not synthetic media). GUI notification 366 further comprises a confidence scoring metric indicating a likelihood that the content portion is not synthetic media, which is derived from a result of the contextual analysis executed by the trained AI model. Similar GUI notifications can be rendered and presented to other users participating in the electronic meeting. For instance, a representation of a GUI of the collaborative communication application/service may be rendered for a third user ("Student 3 Feed"), where a GUI notification, similar to GUI notification 366, is automatically rendered in said representation. This provides real-time (or near real-time) fact checking of content presented by other users, where a notification about the trustworthiness of content presented by other users is sent to users (e.g., audience members) in real-time (or near real-time).

FIG. 4 illustrates a computing system 401 suitable for implementing processing operations described herein related to management of synthetic media detection determinations and notifications thereof, with which aspects of the present disclosure may be practiced. As referenced above, computing system 401 may be configured to implement processing operations of any component described herein including exemplary synthetic media detection component(s) previously described (e.g., synthetic media detection component(s) 106 of FIG. 1A). As such, computing system 401 may be configured as a specific purpose computing device that executes specific processing operations to solve the technical problems described herein including those pertaining to management of authentication of content including generation of synthetic media detection determinations and notifications thereof. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/services or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), process flow 150 (FIG. 1B), method 200 (FIG. 2), and/or the accompanying description of FIGS. 3A-3D.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable, and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more synthetic media detection component (s) 406a as described herein. Software 405 may further comprise application/service component(s) 406b that provide applications/services as described in the foregoing description such as applications/services that enable access to presentation content (and templates thereof) including slide-based presentation applications/services and collaborative communication applications/services usable to enable users to conduct electronic meetings, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of:

GUI objects configured to enable activation of live camera feeds; editing of GUI objects configured to enable activation of live camera feeds; GUI elements (including GUI menus) and application command control features configured to enable management of exemplary GUI objects in conjunction with presentation content (e.g., slide-based presentations); notifications of data insights including data insight suggestions for management of live camera feeds during presentation of content; contextual representations (e.g., user-specific and/or communication-specific) of data insights including exemplary data insight suggestions; and GUI elements for management of recording and playback of presentation content that comprises live camera feeds, among other examples. User interface system 409 comprises a graphical user interface that presents graphical user interface elements representative of any point in the processing described in the foregoing description including processing operations described in system diagram 100 (FIG. 1), method 200 (FIG. 2A), method 250 (FIG. 2B) and front-end representations related to the description of FIGS. 3A-3I. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., a collaborative communication application/service, electronic meeting application/service, etc.) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of reboot estimates relative to updates to be applied to a computing device. For instance, a computer-implemented method may be executed across at least one computing device, including a system, to accomplish processing described herein.

In one non-limiting example, a content portion of a slide-based template is detected that is presented in a slide-based presentation service. This is a trigger for applying a trained AI model that is adapted to generate a determination (e.g., synthetic media detection determination) as to whether the content portion is synthetic media. In doing so, the trained AI model executes processing operations that comprise executing a contextual analysis of the content portion, which comprises analysis of data of the content portion for which a synthetic media detection determination is to be generated. Execution of a contextual analysis comprises generating a confidence scoring metric indicating a likelihood that the content portion is (or is not) synthetic media based on a result of the contextual analysis. The trained AI model further generates a determination as to whether the content portion is synthetic media based on a result of analyzing the confidence scoring metric. As a result of that contextual analysis, a GUI notification is automatically generated that comprises a determination as to whether the content portion is synthetic media. In some technical instances, data for rendering the GUI notification is automatically transmitted to one or more host services, which include the slide-based presentation application/service that presents the content portion. In other technical instances (e.g., where a contextual analysis is being executed on a computing device used to present a representation of a host application/service endpoint), the GUI notification is automatically rendered in one or more host services including the slide-based presentation service. For example, the GUI notification is automatically rendered within the slide-based template proximate to the content portion.

As referenced in the foregoing, some alternative examples of the present disclosure comprise adaptation of a GUI of a host application/service endpoint, where application command control of a GUI comprises a GUI feature that enables users to control application of the trained AI bot to selectively apply trust factor authentication of digital content. For example, the detection of the content portion of the slide-based template occurs based on a receipt of an indication of a user action that selects a GUI feature configured to automatically initiate processing to generate the determination as to whether the content portion is synthetic media. This provides a user with control as to when to execute a synthetic media detection determination, so as not to inundate a user with unwanted notifications. Furthermore, a GUI of a host application/service (and associated endpoints) can be further adapted to provide settings for users to control how/when exemplary notifications should be surfaced for a user (or group of users).

With respect to execution of contextual analysis of a content portion, for generation of synthetic media detection determinations, a trained AI model is configured to: identify a content type of the content portion. The content portion is then segmented into chunks. Processing to segment a content portion into chunks may occur based on identification of the type of content portion. For instance, a video or audio clip may be segmented into frames (or groups of frames), whereas image content is segmented into layers (e.g., foreground, background, scenes) and/or objects (e.g., persons, places, things). This enables a thorough analysis of data attributes of individual chunks of a content portion but also a comparative analysis of chunks of a content portion to determine if there are any indications of digital modification. In one example, areas of interest of each of the chunks of the content portion are identified. In an example where a content portion is image content, an area of interest may be facial features of persons identified in the image content. A comparative analysis of data attributes in each of the chunks occurs relative to the area of interest identified for each of the chunks. The confidence scoring metric is then generated based on a result of the comparative analysis of the data attributes in each of the chunks of the content portion.

In other examples, data attributes are analyzed comparative to reference resources. For example, a textual content portion can be separated into sections, where data (and metadata) of a section of content can be compared against one or more resources accessed via a network connection (e.g., the Internet). In one example, references resources are user-specific (e.g., previous written content/handwritten content of a user, voice-recognition analysis of the user). In other examples, reference resources are authoritative works that pertain to specific types of information, people, facts ideas, etc. For instance, a reference resource for a textual content portion may be a dictionary or thesaurus. In further examples, a plurality of reference resources is utilized to comparatively evaluate a content portion. As an example, if a determination is evaluating whether a content portion is fake news, a plurality of trusted news outlets may be analyzed to determine the credibility of the content portion. It is to be understood that reference resources as described herein are specific to the type of content being evaluated and comprise any digital content, accessible over the Internet, that may be comparatively evaluated against the content portion. Reference resources may be stored and/or accessed via knowledge repositories of the present disclosure. In an example where one or more reference resources are being utilized in a synthetic media detection determination, a comparative analysis of data attributes of an area of interest, in each of the chunks of the content portion, occurs relative to one or more references resources. As a result, an exemplary confidence scoring metric is generated based on a result of the comparatively analyzing of the data attributes of the area of interest, in each of the chunks of the content portion, to the reference resource.

Non-limiting examples of data attributes depend on the content type of the content portion being analyzed. In some technical instances, a plurality of trained AI models is generated that are each adapted to a specific content type of digital content. In one example, processing applied comprises selecting, from a plurality of trained AI models, a trained AI model that is adapted to analyze a specific content type of digital content. For example, the data attributes of each of the chunks of the content portion comprise pixel values of the area of interest and neighboring pixel values of pixels surrounding the area of interest. In such an example, the data attributes of each of the chunks of the content portion further comprise two or more of: shading associated with the area of interest, shadowing associated with the area of interest, lighting associated with the area of interest, transitions between frames in each of the chunks, and metadata associated with each of the chunks.

Furthermore, non-limiting examples of the present disclosure can generate different types of GUI notifications to notify users whether digital content is predicted as being synthetic media. For instance, automatic generation of an exemplary GUI notification further inserts, in the GUI notification any of the following contextual information: data identifying the confidence scoring metric; data indicating a content range of the content portion that is identified as synthetic media; data identifying a rationale supporting the determination as to whether the content portion is synthetic media; GUI features/elements for provision of user feedback relative to a GUI notification; and a combination thereof. Data identifying the rationale supporting a predictive determination is derived from a parameter associated with the contextual analysis. In one technical instance, two or more of the above identified types of contextual information are included in a generated GUI notification. In some examples, different levels of representation of a GUI notification are rendered with different types of contextual information. For instance, a first-level GUI notification presents a synthetic media detection determination. A user may then execute a user action, relative to the first level GUI notification, to reveal additional contextual information about the synthetic media detection determination.

It is further to be recognized that the present disclosure further describes technical examples where notifications of synthetic media detection determinations may be synchronized through a plurality of different host applications/services (and associated endpoints). For instance, automatic transmission of the data for rendering the GUI notification further comprises: identifying one or more host application/service endpoints in which a representation of the slide-based template is rendered; and transmitting the data for rendering the GUI notification to the one or more host service endpoints identified. An exemplary collaborative framework is implemented to dynamically manage data associated with a representation of digital content, and further synchronize any updates with other representations of the digital content which are either embedded in other host application/service endpoints or are the original source content (e.g., an electronic document, file, digital canvas). An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As an example, a representation of digital content (e.g., slide-based presentation deck) is included in an electronic meeting hosted through a collaborative communication application/service). During an instance of the electronic meeting, content portions of digital content are presented, which is a trigger for generation of a synthetic media detection determinations for the content portions. When such predictive determinations are generated, processing occurs to determine any other representations of that digital content, so that exemplary notifications of the present disclosure can be provided to pertinent host application/service endpoints. In such examples, the open-source collaborative framework is utilized to manage states of representations of said digital content (e.g., via data mappings) across a plurality of host applications/services (and associated endpoints). If a representation of the presentation content is embedded inline within other host applications/services, said representations are automatically updated to provide a notification that comprises a result of a synthetic media detection determination. Inline, as referenced in the present disclosure, is intended to refer to technical instances where data is embedded as a content portion (data object), among other content portions, that is displayable within a rendering of a GUI of a host application/service endpoint.

Reference has been made throughout this specification to "one example," "exemplary" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
    detecting a content portion of a slide-based template presented in a slide-based presentation service;
    applying a trained artificial intelligence (AI) model that is adapted to generate a determination as to whether the content portion is synthetic media, where the trained AI model executes processing operations that comprise:
        identifying a content type of the content portion,
        segmenting the content portion into content chunks based on the content type,
        selecting a second trained AI model from a plurality of trained AI models based on the content type, the second trained AI model trained to analyze data of the content type,
        applying the second trained AI model to the content chunks, wherein the second trained AI model is trained to execute a contextual analysis of each of the content chunks, the contextual analysis comprising an analysis of each of the content chunks individually and a comparative analysis of each of the content chunks,
            generating a confidence scoring metric indicating a likelihood that the content portion is synthetic media based on a result of the contextual analysis, and
            generating the determination as to whether the content portion is synthetic media based on a result of analyzing the confidence scoring metric;
    automatically generating a graphical user interface (GUI) notification that comprises the determination as to whether the content portion is synthetic media; and
    automatically transmitting data for rendering the GUI notification to one or more host services including the slide-based presentation service.

2. The computer-implemented method of claim 1, wherein the detecting of the content portion of the slide-based template occurs based on a receipt of an indication of a user action that selects a GUI feature configured to automatically initiate processing to generate the determination as to whether the content portion is synthetic media.

3. The computer-implemented method of claim 1, wherein the contextual analysis comprises: identifying an area of interest in each of the content chunks, comparatively analyzing data attributes, relative to the area of interest, in each of the content chunks, and wherein the confidence scoring metric is generated based on a result of the comparatively analyzing of the data attributes in each of the content chunks.

4. The computer-implemented method of claim 3, wherein the data attributes of each of the content chunks comprise pixel values of the area of interest and neighboring pixel values of pixels surrounding the area of interest.

5. The computer-implemented method of claim 3, wherein the data attributes of each of the content chunks further comprise two or more of: shading associated with the area of interest, shadowing associated with the area of interest, lighting associated with the area of interest, transitions between frames in each of the content chunks, and metadata associated with each of the content chunks.

6. The computer-implemented method of claim 1, wherein the contextual analysis comprises: identifying an area of interest in each of the content chunks, comparatively analyzing data attributes of the area of interest, in each of the content chunks, to a reference resource, and wherein the confidence scoring metric is generated based on a result of the comparatively analyzing of the data attributes of the area of interest, in each of the content chunks, to the reference resource.

7. The computer-implemented method of claim 1, wherein the automatically generating of the GUI notification further inserts in the GUI notification data identifying the confidence scoring metric and data indicating a content range of the content portion that is identified as synthetic media.

8. The computer-implemented method of claim 1, wherein the automatically generating of the GUI notification further inserts in the GUI notification data identifying the confidence scoring metric and data identifying a rationale supporting the determination as to whether the content portion is synthetic media, wherein the data identifying the rationale is derived from a parameter associated with the contextual analysis.

9. The computer-implemented method of claim 1, wherein the automatically transmitting of the data for rendering the GUI notification further comprises: identifying one or more host service endpoints in which a representation of the slide-based template is rendered, and transmitting the data for rendering the GUI notification to the one or more host service endpoints identified.

10. A system comprising:
    at least one processor; and
    a memory, operatively connected with the at least one processor, storing computer-executable instructions that, when executed by the at least one processor, causes the at least one processor to execute a method that comprises:
        detecting a content portion of a slide-based template presented in a slide-based presentation service;
        applying a trained artificial intelligence (AI) model that is adapted to generate a determination as to whether the content portion is synthetic media, where the trained AI model executes processing operations that comprise:
            identifying a content type of the content portion,
            segmenting the content portion into content chunks based on the content type,
            selecting a second trained AI model from a plurality of trained AI models based on the content type, the second trained AI model trained to analyze data of the content type,
            applying the second trained AI model to the content chunks, wherein the second trained AI model is trained to execute a contextual analysis of each of the content chunks, the contextual analysis comprising an analysis of each of the content chunks individually and a comparative analysis of each of the content chunks, generating a confidence scoring metric indicating a likelihood that the content portion is synthetic media based on a result of the contextual analysis, and generating the determination as to whether the content portion is synthetic media based on a result of analyzing the confidence scoring metric;

automatically generating a graphical user interface (GUI) notification that comprises the determination as to whether the content portion is synthetic media; and automatically transmitting data for rendering the GUI notification to one or more host services including the slide-based presentation service.

11. The system of claim 10, wherein the detecting of the content portion of the slide-based template occurs based on a receipt of an indication of a user action that selects a GUI feature configured to automatically initiate processing to generate the determination as to whether the content portion is synthetic media.

12. The system of claim 10, wherein the contextual analysis comprises: identifying an area of interest in each of the content chunks, comparatively analyzing data attributes, relative to the area of interest, in each of the content chunks, and wherein the confidence scoring metric is generated based on a result of the comparatively analyzing of the data attributes in each of the content chunks.

13. The system of claim 12, wherein the data attributes of each of the content chunks comprise pixel values of the area of interest and neighboring pixel values of pixels surrounding the area of interest.

14. The system of claim 12, wherein the data attributes of each of the content chunks further comprise two or more of: shading associated with the area of interest, shadowing associated with the area of interest, lighting associated with the area of interest, transitions between frames in each of the content chunks, and metadata associated with each of the content chunks.

15. The system of claim 10, wherein the contextual analysis comprises: identifying an area of interest in each of the content chunks, comparatively analyzing data attributes of the area of interest, in each of the content chunks, to a reference resource, and wherein the confidence scoring metric is generated based on a result of the comparatively analyzing of the data attributes of the area of interest, in each of the content chunks, to the reference resource.

16. The system of claim 10, wherein the automatically generating of the GUI notification further inserts in the GUI notification data identifying the confidence scoring metric and data indicating a content range of the content portion that is identified as synthetic media.

17. The system of claim 10, wherein the automatically generating of the GUI notification further inserts in the GUI notification data identifying the confidence scoring metric and data identifying a rationale supporting the determination as to whether the content portion is synthetic media, wherein the data identifying the rationale is derived from a parameter associated with the contextual analysis.

18. The system of claim 10, wherein the automatically transmitting of the data for rendering the GUI notification further comprises: identifying one or more host service endpoints in which a representation of the slide-based template is rendered, and transmitting the data for rendering the GUI notification to the one or more host service endpoints identified.

19. A computer-implemented method comprising:
detecting a content portion of a slide-based template presented in a slide-based presentation service;
applying a trained artificial intelligence (AI) model that is adapted to generate a determination as to whether the content portion is synthetic media, where the trained AI model executes processing operations that comprise:
identifying a content type of the content portion,
segmenting the content portion into content chunks based on the content type,
selecting a second trained AI model from a plurality of trained AI models based on the content type, the second trained AI model trained to analyze data of the content type,
applying the second trained AI model to the content chunks, wherein the second trained AI model is trained to execute a contextual analysis of each of the content chunks, the contextual analysis comprising an analysis of each of the content chunks individually and a comparative analysis of each of the content chunks,
generating a confidence scoring metric indicating a likelihood that the content portion is synthetic media based on a result of the contextual analysis, and
generating the determination as to whether the content portion is synthetic media based on a result of analyzing the confidence scoring metric;
automatically generating a graphical user interface (GUI) notification that comprises the determination as to whether the content portion is synthetic media; and
automatically rendering the GUI notification in one or more host services including the slide-based presentation service, wherein the automatically rendering renders the GUI notification within the slide-based template proximate to the content portion.

20. The computer-implemented method of claim 19, wherein the automatically generating of the of the GUI notification further inserts, in the GUI notification, two or more of: data identifying the confidence scoring metric; data indicating a content range of the content portion that is identified as synthetic media; and data identifying a rationale supporting the determination as to whether the content portion is synthetic media, and wherein the data identifying the rationale is derived from a parameter associated with the contextual analysis.

* * * * *